(12) United States Patent
Kim et al.

(10) Patent No.: US 10,705,654 B2
(45) Date of Patent: Jul. 7, 2020

(54) TOUCH DISPLAY DEVICE INCLUDING TOUCH DRIVING INTEGRATED CIRCUIT FOR NOISE DETECTION AND COMPENSATION AND OPERATING METHOD OF TOUCH DRIVING INTEGRATED CIRCUIT

(71) Applicant: SAMSUNG ELECTRONICS CO., LTD., Suwon-si (KR)

(72) Inventors: Bumsoo Kim, Seoul (KR); Chadong Kim, Gwacheon-si (KR); Junchul Park, Daegu (KR); Kyeonggon Lee, Hwaseong-si (KR); YoonKyung Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 69 days.

(21) Appl. No.: 15/675,398

(22) Filed: Aug. 11, 2017

(65) Prior Publication Data
US 2018/0046325 A1 Feb. 15, 2018

(30) Foreign Application Priority Data

Aug. 12, 2016 (KR) .................. 10-2016-0103064
Nov. 24, 2016 (KR) .................. 10-2016-0157608

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01); *G06F 3/0412* (2013.01)

(58) Field of Classification Search
CPC ....... G06F 3/0412; G06F 3/0418; G06F 3/044
See application file for complete search history.

(56) References Cited

U.S. PATENT DOCUMENTS

| | | | |
|---|---|---|---|
| 7,102,364 B2 | 9/2006 | Umeda et al. | |
| 8,730,189 B2 | 5/2014 | Mamba et al. | |
| 9,501,193 B2 | 11/2016 | Schwartz et al. | |
| 2005/0122785 A1 | 6/2005 | Umeda et al. | |
| 2010/0079401 A1 | 4/2010 | Staton | |
| 2010/0309162 A1* | 12/2010 | Nakanishi | G06F 3/044 345/174 |
| 2011/0153263 A1* | 6/2011 | Oda | G06F 3/03545 702/150 |
| 2011/0216033 A1 | 9/2011 | Mamba et al. | |
| 2013/0300690 A1* | 11/2013 | Yang | G06F 3/0416 345/173 |
| 2014/0160070 A1* | 6/2014 | Miyamoto | G06F 3/0416 345/174 |
| 2015/0153870 A1 | 6/2015 | Lee et al. | |
| 2015/0177887 A1 | 6/2015 | Schwartz et al. | |

FOREIGN PATENT DOCUMENTS

| | | |
|---|---|---|
| JP | 2013-97687 A | 5/2013 |
| KR | 10-1631376 B1 | 6/2016 |

* cited by examiner

*Primary Examiner* — Ram A Mistry
(74) *Attorney, Agent, or Firm* — Sughrue Mion, PLLC

(57) ABSTRACT

An operating method of a touch driving integrated circuit (TDI) sensing a user touch on a touch panel includes: transmitting a first touch signal through a transmission line connected with the touch panel; receiving a first sensing signal through a reception line connected to the touch panel; receiving a first display noise through a detection line connected to the touch panel; and offsetting a noise included in the first sensing signal by using the first display noise.

19 Claims, 17 Drawing Sheets

| TSC | Display | Power Generator | Timing information |
|---|---|---|---|
| Sleep | Sleep | Sleep | Off |
| Sleep | Normal | Normal | Off |
| Normal | Sleep | Sleep | On |
| Normal | Normal | Normal | On |

TOUCH DISPLAY DEVICE INCLUDING TOUCH DRIVING INTEGRATED CIRCUIT FOR NOISE DETECTION AND COMPENSATION AND OPERATING METHOD OF TOUCH DRIVING INTEGRATED CIRCUIT

CROSS-REFERENCE TO THE RELATED APPLICATIONS

This application claims priorities from Korean Patent Applications No. 10-2016-0103064 filed Aug. 12, 2016, and 10-2016-0157608 filed Nov. 24, 2016, in the Korean Intellectual Property Office, the entire disclosures of which are incorporated herein by reference.

BACKGROUND

1. Field

Apparatuses consistent with example embodiments of the inventive concept disclosed herein relate to a display device, and more particularly, to a touch display device and an operating method thereof.

2. Description of the Related Art

Electronic devices such as a smartphone, a digital camera, a notebook computer, a navigation system, and a smart television include display devices to provide information. There is being developed a touch display device with a touch function to provide users of the electronic devices with various user experiences. The touch display device is provided in an in-cell, on-cell, or out-cell form in which a touch panel and a display panel are combined. In recent years, as an electronic device is miniaturized, there is a need to miniaturize the touch display device. As the touch display device becomes gradually smaller, various issues occur due to a driving method or different physical characteristics.

SUMMARY

Example embodiments of the inventive concept provide a touch display device that detects and compensates for a display noise generated in a display panel to improve reliability and an operating method thereof.

According to an example embodiment, there is provided an operating method of a touch driving integrated circuit (TDI) sensing a user touch or proximity on a touch panel. The method may include: transmitting a first touch signal through a transmission line connected with the touch panel; receiving a first sensing signal through a reception line connected to the touch panel; receiving a first display noise through a detection line connected to the touch panel; and offsetting a noise included in the first sensing signal by using the first display noise.

According to an example embodiment, there is provided a touch display device which may include: a display panel that includes a plurality of pixels; a touch panel that includes a plurality of transmission lines extending in a row direction and a plurality of reception lines extending in a column direction; and a TDI configured to provide a touch signal to a first transmission line among the plurality of transmission lines, receive sensing signals through the plurality of reception lines, detect a display noise, which is transferred from the display panel to the touch panel, through a second transmission line among the plurality of transmission lines, to offset noises included in the sensing signals by using the display noise, and sense a user touch on the touch panel based on the sensing signals from which the noises are offset.

According to an example embodiment, there is provided a touch display which may include: a display panel comprising a plurality of pixels; a touch panel configured to receive a user touch or proximity thereon and comprising a plurality of transmission lines and a plurality of reception lines; and a TDI configured to transmit a first touch signal sensing the user touch or proximity to a first transmission line among the transmission lines, receive the first touch signal plus a first noise through a first reception line among the reception lines, detect a second noise through at least one of a second transmission line among the transmission lines and a second reception line among the reception lines, and output the first touch signal less the first noise by offsetting the first noise with the second noise for determination of the sensing the user touch or proximity, wherein, during transmission of the first touch signal, the TDI does not transmit a touch signal sensing the user touch or proximity to the at least one of the second transmission line and the second reception line.

BRIEF DESCRIPTION OF THE DRAWINGS

The above and other aspects and features will become apparent from the following description with reference to the accompanying drawings, wherein like reference numerals refer to like parts throughout the drawings unless otherwise specified, and wherein.

DETAILED DESCRIPTION OF THE EXAMPLE EMBODIMENTS

Below, example embodiments of the inventive concept are described in detail and clearly to such an extent that an ordinary one in the art easily implements the example embodiments.

Figure 1:
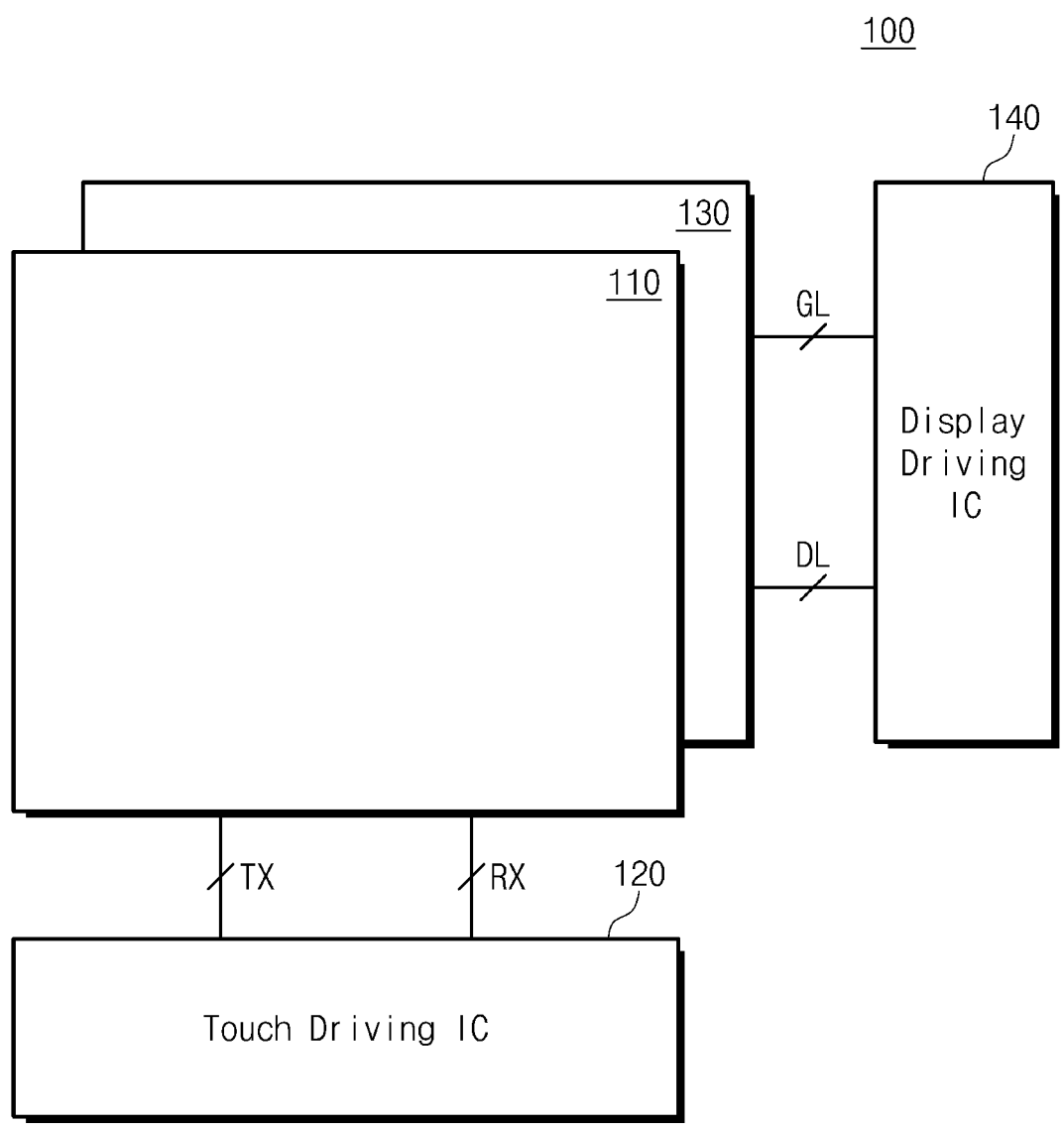
FIG. 1 is a block diagram illustrating a display device, according to an example embodiment of the inventive concept.

FIG. 1 is a block diagram illustrating a display device, according to an example embodiment. Referring to FIG. 1, a display device 100 may include a touch panel 110, a touch driving integrated circuit (IC) (hereinafter referred to as "TDI") 120, a display panel 130, and a display driving IC (hereinafter referred to as "DDI") 140.

In example embodiments, the display device 100 may be a touch display device that has a touch function used in electronic devices such as a smartphone and a tablet personal computer (PC).

The touch panel 110 may sense a user touch, and obtain coordinate information of an area in which the user touch is sensed. The touch panel 110 may include a plurality of transmission lines TX arranged in a row direction and a plurality of reception lines RX arranged in a column direction. The touch panel 110 may receive a touch signal through the transmission lines TX, and output reception signals through the reception lines RX.

The TDI 120 may be connected with the transmission lines TX and the reception lines RX. The TDI 120 may provide a touch signal through the transmission lines TX, and determine whether a user touch is made on the touch panel 110, based on signals received through the reception lines RX.

More specifically, the TDI 120 may provide a touch signal to at least one of the transmission lines TX, and receive touch signals through the reception lines RX. In a case where the touch panel 110 is touched by a portion of user's body, capacitance of the touch area may change. Touch signals received through the reception lines RX change with the capacitance change, and the TDI 120 may determine whether a user touch is made, based on the change in the touch signals. In example embodiments, signals received through the reception lines RX may be referred to as "sensing signal". Below, for ease of description, a term of the sensing signal or the touch signal may be used interchangeably to indicate signals received through the reception lines RX. According to an example embodiment, the term "touch", "a user touch" or its equivalent on a corresponding position at a touch pad such as the touch pad 110, as described herein, may include proximity of a user's touch sensed at the corresponding position.

In example embodiments, the above-described operating manner of the touch panel 110 and the TDI 120 may be a capacitive manner. However, embodiments of the inventive concept may not be limited thereto. For example, the touch panel 110 may include touch panels of various sensing types: self-capacitance, mutual-capacitance, electromagnetic induction, and resistive, and the TDI 120 may support operations corresponding to the above-described types. Below, for ease of description, example embodiments of the inventive concept will be described based on the mutual-capacitance type.

The display panel 130 may include a plurality of pixels. The pixels may be connected with gate lines GL and data lines DL. Each pixel may display image information in response to a signal from a corresponding one of the gate lines GL and a signal from a corresponding one of the data lines DL. In example embodiments, the display panel 130 may include one of various display panels such as an organic light emitting display panel, a liquid crystal display panel, a plasma display panel, an electrophoretic display panel, and an electrowetting display panel. In example embodiments, the display panel 130 may be a flexible display panel.

The DDI 140 may be connected with the display panel 130 through the gate lines GL and the data lines DL. The DDI 140 may control voltages of the gate lines GL and the data lines DL in response to a control signal (e.g., a vertical synchronization signal and a horizontal synchronization signal) from an external device (e.g., a timing controller).

In example embodiments, the touch panel 110 may be arranged on the display panel 130. For example, the touch panel 110 and the display panel 130 may be formed on separate semiconductor substrates, respectively. Alternatively, the touch panel 110 may be manufactured by a continuous process with the display panel 130. That is, the touch panel 110 may be formed in an on-cell type or an out-cell type.

In example embodiments, various noises may be generated on the display panel 130 while signals are provided to the data lines DL or the gate lines GL connected with the display panel 130, or the display panel 130 operates. The noises may be transferred to the touch panel 110 through one or more parasitic capacitors between the touch panel 110 and the display panel 130.

For example, as described above, the touch panel 110 may be arranged on the display panel 130. Due to the arrangement, the parasitic capacitors may exist between the touch panel 110 and the display panel 130, and thus, noises may be transferred to the touch panel 110 through the parasitic capacitors. The noises transferred to the touch panel 110 may cause a decrease in reliability of a touch sensing operation of the touch panel 110 and the TDI 120. That is, the TDI 120 may fail to exactly detect a user touch due to the noises transferred to the touch panel 120.

According to an example embodiment of the inventive concept, the TDI 120 may detect a noise transferred from the display panel 130 to the touch panel 110 by using at least one of the transmission lines TX or at least one of the reception lines RX, and cancel or offset a noise included in one or more sensing signals received through the reception lines RX, thereby improving the reliability of a touch sensing operation. According to an example embodiment of the inventive concept, the TDI 120 and an operating method thereof will be more fully described with reference to accompanying drawings.

Figure 2:
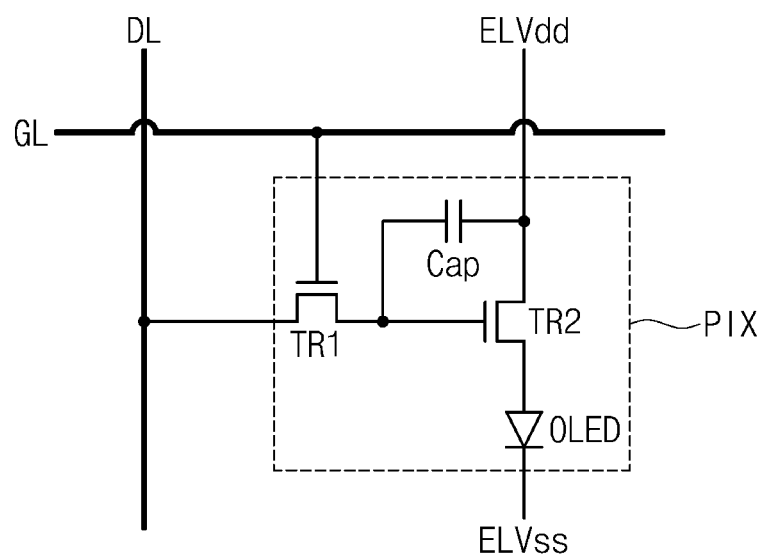
FIG. 2 is a circuit diagram illustrating one among a plurality of pixels included in a display panel of FIG. 1, according to an example embodiment of the inventive concept.

FIG. 2 is a circuit diagram illustrating one among a plurality of pixels included in a display panel of FIG. 1. In example embodiments, a pixel PIX illustrated in FIG. 2 is an OLED pixel. However, embodiments of the inventive concept may not be limited thereto.

Referring to FIGS. 1 and 2, the pixel PIX may include first and second transistors TR1 and TR2, a capacitor Cap, and an organic light-emitting element OLED. In example embodiments, the pixel PIX illustrated in FIG. 2 may not be limited to a configuration of a pixel that includes the first and second transistors TR1 and TR2.

An anode of the organic light-emitting element OLED is connected to receive a first power supply voltage ELVdd through the second transistor TR2. A cathode of the organic light-emitting element OLED is connected to receive a second power supply voltage ELVss. The first transistor TR1 outputs a data signal applied to a data line DL in response to a signal applied to a gate line GL. The capacitor Cap charges a voltage corresponding to the data signal from the first transistor TR1. The second transistor TR2 may adjust a driving current flowing to the organic light-emitting element OLED based on a voltage stored in the capacitor Cap. In example embodiments, the second power supply voltage ELVss may be a ground voltage.

In example embodiments, when the pixel PIX is being driven, a noise may be generated due to various components of the pixel PIX. As an example, when a gate signal is provided through the gate line GL, a noise may be generated at a cathode terminal of the organic light-emitting element OLED. In example embodiments, the cathode terminal of the organic light-emitting element OLED may be formed adjacent to the touch panel 110 of FIG. 1. In this case, the noise generated at the cathode terminal of the organic light-emitting element OLED is transferred to the touch panel 110, thereby causing a decrease in the reliability of the touch sensing operation.

Below, for ease of description, the noise that is generated at the cathode terminal of the organic light-emitting element OLED or is transferred from the cathode terminal of the organic light-emitting element OLED is referred to as a "display noise". This is only for an easy description, and the display noise may be generated from various components included in the display panel 130 or may be a noise signal transferred from the various components.

Figure 3:
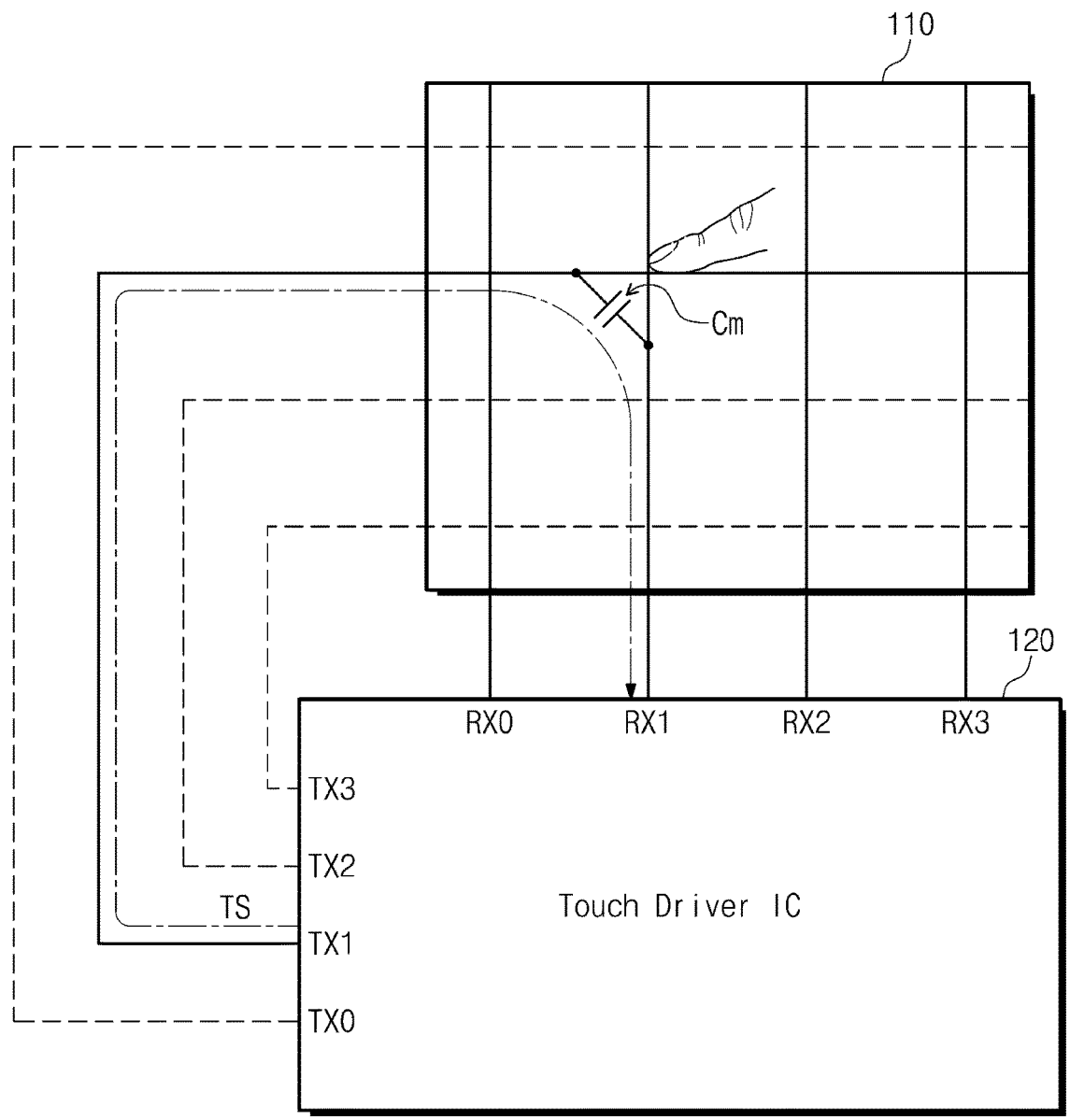
FIG. 3 is a drawing for describing a touch sensing operation of a touch panel and a touch driving integrated circuit (TDI) of FIG. 1, according to an example embodiment of the inventive concept.

FIG. 3 is a drawing for describing a touch sensing operation of a touch panel and a touch driving IC of FIG. 1. Referring to FIGS. 1 and 3, the touch panel 110 may include a plurality of transmission lines TX0 to TX3 extending along the row direction and a plurality of reception lines RX0 to RX3 extending along the column direction. In example embodiments, the touch panel 110 is not limited to a configuration illustrated in FIG. 3, and further include more transmission lines and more reception lines. Also, the transmission lines TX0 to TX3 and the reception lines RX0 to RX3 are illustrated in FIG. 3 by straight lines for ease of illustration, not limiting thereto. However, the transmission lines TX0 to TX3 and the reception lines RX0 to RX3 may be implemented in various forms.

The TDI 120 may be connected with the transmission lines TX0 to TX3 and the reception lines RX0 to RX3. The TDI 120 may provide touch signals TS to the transmission lines TX0 to TX3, and sense whether a user touch is made, based on signals received through the reception lines RX0 to RX3.

For example, the TDI 120 may provide a touch signal TS through the first transmission line TX1. The touch signal TS provided to the first transmission line TX1 may be provided back to the TDI 120 through a mutual capacitor Cm between the first transmission line TX1 and the reception line RX1. In this case, if a user touches an area at which the first transmission line TX1 and the first reception line RX1 cross, a value of the mutual capacitor Cm may change due to the user touch. A signal that is received through the first reception line RX1 may change with the value change of the mutual capacitor Cm, and thus, the TDI 120 may sense a signal change (i.e., sense the user touch).

For ease of description, the transmission lines TX0 to TX3 and the reception lines RX0 to RX3 are illustrated in FIG. 3 as crossing each other. The transmission lines TX0 to TX3 and the reception lines RX0 to RX3 may be arranged to be spaced apart from each other by a distance. The arrangement of the transmission lines TX0 to TX3 and the reception lines RX0 to RX3 may not be limited to the configuration illustrated in FIG. 3, and the transmission lines TX0 to TX3 and the reception lines RX0 to RX3 may be arranged in various manners.

Figure 4:
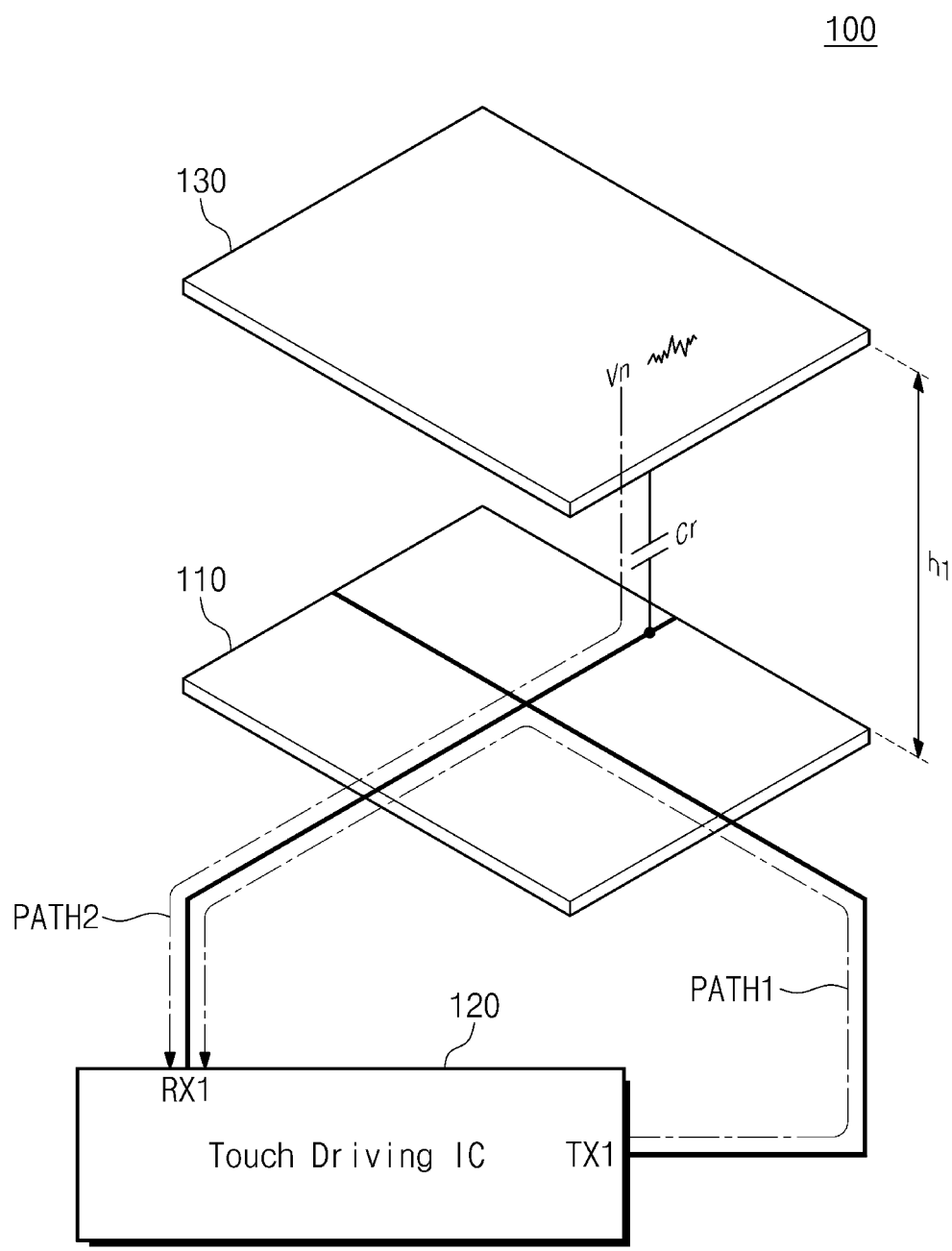
FIG. 4 is a drawing for describing a display noise transferred from a display panel of FIG. 1 to a touch panel, according to an example embodiment of the inventive concept.

FIG. 4 is a drawing for describing a display noise transferred from a display panel of FIG. 1 to a touch panel. For a brief description, components that are unnecessary to describe the display noise are omitted.

Referring to FIGS. 1, 2, and 4, the display device 100 may include the touch panel 110 and the display panel 130. The touch panel 110 and the display panel 130 may be arranged to be spaced apart from each other by a first height h1. As described above, a touch signal TS that is provided through the first transmission line TX1 of the touch panel 110 may be provided to the first reception line RX1 along a first path PATH1.

In this case, a display noise Vn may be generated by an operation of the display panel 130. In example embodiments, the display noise Vn may be an irregular voltage or signal. The display noise Vn may be transferred to the touch panel 110 through a capacitor Cr (or a parasitic capacitor) between the touch panel 110 and the display panel 130.

For example, the first reception line RX1 and the display panel 130 may be spaced apart from each other by the first height h1. For this reason, the parasitic capacitor Cr may exist between the first reception line RX1 and the display panel 130. The parasitic capacitor Cr may be a transmission path (i.e., second path PATH2) of the display noise Vn generated in the display panel 130.

The display noise Vn generated in the display panel 130 may be provided to the TDI 120 along a second path PATH2. That is, since the TDI 120 receives the touch signal TS along with the display noise Vn through the first reception line RX1, the TDI 120 may fail to perform an exact touch sensing operation due to the display noise Vn.

In example embodiments, a level of the display noise Vn transferred from the display panel 130 may become larger as a distance between the touch panel 110 and the display panel 130 becomes shorter. For example, the size of the parasitic capacitor Cr between the touch panel 110 and the display panel 130 may become larger as a distance between the touch panel 110 and the display panel 130 becomes shorter. A level of the display noise Vn transferred from the display panel 130 may become larger as the size of the parasitic capacitor Cr becomes larger. An increase in the display noise Vn may reduce the reliability of the touch sensing operation.

Figure 5:
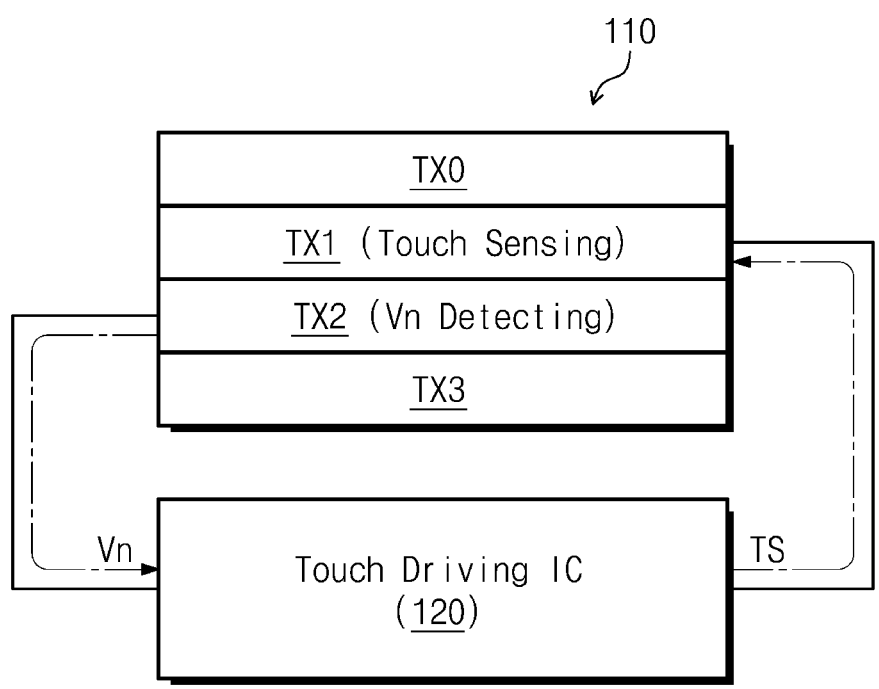
FIG. 5 is a drawing for describing an operation of a display device, according to an example embodiment of the inventive concept.

FIG. 5 is a drawing for describing an operation of a display device, according to an example embodiment of the inventive concept. For brevity of illustration and ease of description, components that are unnecessary to describe a display noise canceling operation corresponding to an example embodiment of inventive concept are omitted. Below, for a brief description, it is assumed that the touch panel 110 includes the transmission lines TX0 to TX3. However, embodiments of the inventive concept may not be limited thereto.

Referring to FIGS. 1 and 3 to 5, the display device 100 may include the touch panel 110 and the TDI 120. The TDI 120 may perform a touch sensing operation by providing a touch signal TS to each of the transmission lines TX0 to TX3.

For example, the TDI 120 may provide a touch signal TS to the first transmission line TX1. As described above, the touch signal TS transferred to the first transmission line TX1 may be provided to the TDI 120 through the reception lines RX0 to RX3 (not illustrated in FIG. 5). As described above, signals received through the reception lines RX0 to RX3 may include a display noise Vn.

According to an example embodiment of the inventive concept, the TDI 120 may detect the display noise Vn through a transmission line (e.g., the second transmission line TX2), on which a touch operation is not performed, of the transmission lines TX0 to TX3. In other words, the TDI 120 may detect the display noise Vn by using a transmission line to which the touch signal TS is not provided.

For example, as described above, the display noise Vn generated in the display panel 130 may be transferred to the touch panel 110 through a parasitic capacitor between the touch panel 110 and the display panel 130. The display noise Vn may be transferred to the touch panel 110 through a parasitic capacitor (not illustrated) between the transmission lines TX0 to TX3 and the display panel 130 as well as through the second path PATH2 described with reference to FIG. 4.

According to an example embodiment of the inventive concept, the TDI 120 may detect the display noise Vn through a transmission line (in particular a transmission line on which a touch operation is not performed. The TDI 120 may cancel or offset the display noise Vn included in signals received through the reception lines RX0 to RX3, based on or using the detected display noise Vn. With the above description, since the display noise Vn included in the reception lines RX0 to RX3 is canceled, the reliability of the touch sensing operation of the TDI 120 may be improved.

The embodiment illustrated in FIG. 5 is only an example, and embodiments of the inventive concept may not be limited thereto. A transmission line for detecting the display noise Vn may be variously selected or modified. For example, the TDI 120 may receive or detect the display noise Vn through at least one of transmission lines on which the touch sensing operation is not performed. As another example, the TDI 120 may detect the display noise Vn through an upper transmission line or a lower transmission line that is adjacent to a transmission line on which the touch sensing operation is performed. As another example, the TDI 120 may detect the display noise Vn through a dedicated line (or a display noise detection line) for detecting a display noise. As another example, the TDI 120 may detect a display noise through at least one of a plurality of reception lines.

The embodiments are only examples, not limiting the scope and spirit of the inventive concept. It may be understood that embodiments of the inventive concept are variously changed or modified without departing from the scope and spirit of the inventive concept.

Figure 6:
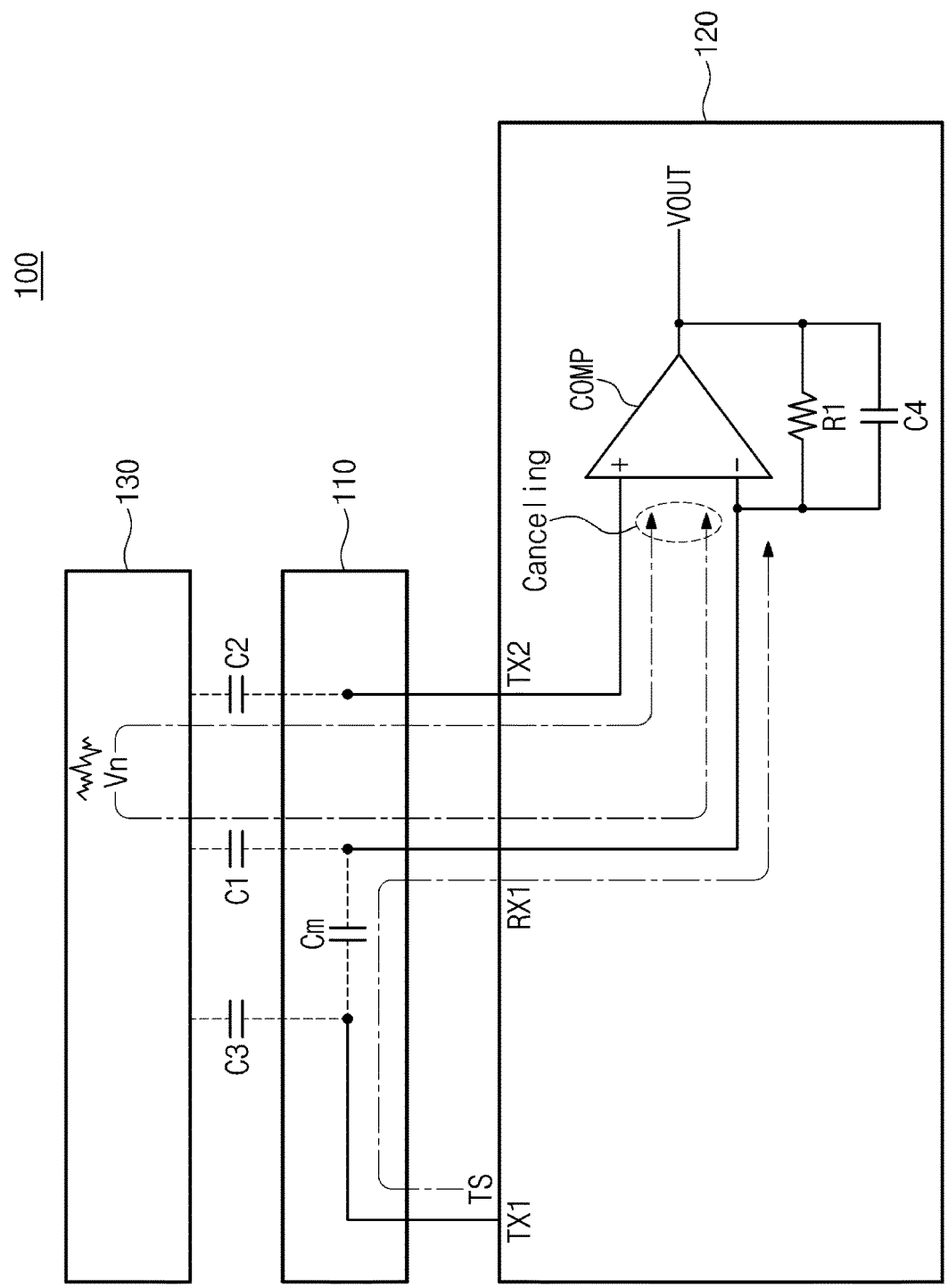
FIG. 6 is a drawing for more fully describing the example embodiment of FIG. 5.

FIG. 6 is a drawing for more fully describing the example embodiment of FIG. 5. For a brief description, components that are unnecessary to describe the display noise canceling method are omitted. Also, in the following example embodiments, a touch sensing operation that is performed through the first transmission line TX1 and the first reception line RX1 will be described. However, embodiments of the inventive concept may not be limited thereto. For example, the touch sensing operation may be performed in units of a row, a column, an array/panel.

Also, for brevity of illustration and for ease of description, it is assumed that the TDI 120 detects a display noise Vn through the second transmission line TX2. However, embodiments of the inventive concept may not be limited thereto.

Referring to FIGS. 5 and 6, the display device 100 may include the touch panel 110, the TDI 120, and the display panel 130. The TDI 120 may provide a touch signal TS to the touch panel 110 through the first transmission line TX1. The touch signal TS provided through the first transmission line TX1 may be provided back to the TDI 120 through the mutual capacitor Cm and the first reception line RX1. In this case, as described above, the display noise Vn generated in the display panel 130 may be transferred to the TDI 120 through a first capacitor C1 and the first reception line RX1. That is, the TDI 120 may receive the touch signal TS and the display noise Vn through the first reception line RX1.

The TDI 120 may receive or detect the display noise Vn through the second transmission line TX2 while the touch signal TS is provided to the first transmission line TX1. For example, a second capacitor C2 and a third capacitor C3 may exist between the display panel 130 and the second transmission lines TX2 and between the display panel 130 and the first transmission lines TX1, respectively. The second and third capacitors C2 and C3 may be parasitic capacitors. The display noise Vn generated in the display panel 130 may be transferred to the second transmission line TX2 through the second capacitor C2. The TDI 120 may detect the display noise Vn transferred to the second transmission line TX2.

The TDI 120 may include a comparator COMP, a first resistor R1, and a fourth capacitor C4. The first resistor R1 and the fourth capacitor C4 are connected in parallel between a second input terminal (−) and an output terminal of the comparator COMP.

Signals (i.e., the touch signal TS and the display noise Vn) received from the first reception line RX1 are input to the second terminal (−) of the comparator COMP. The display noise Vn detected and received from the second transmission line TX2 is input to a first terminal (+) of the comparator COMP.

The comparator COMP may cancel the display noise Vn from the signal received from the first reception line RX1 based on the received signals, and output an output signal VOUT. That is, the output signal VOUT may be the touch signal TS from which the display noise Vn is canceled. In example embodiments, the TDI 120 may determine whether a touch is made, based on the output signal VOUT. For example, the TDI 120 may determine whether a user touch is made, by comparing a separate reference signal and the output signal VOUT.

As described above, the TDI 120 may receive or detect the display noise Vn from a transmission line on which the touch sensing operation is not performed or from a transmission line to which the touch signal TS is not provided, and cancel or offset the display noise Vn from the signals received through the reception lines RX. Accordingly, it may be possible to prevent the reliability of the touch sensing operation from decreasing due to the display noise Vn.

Figure 7:
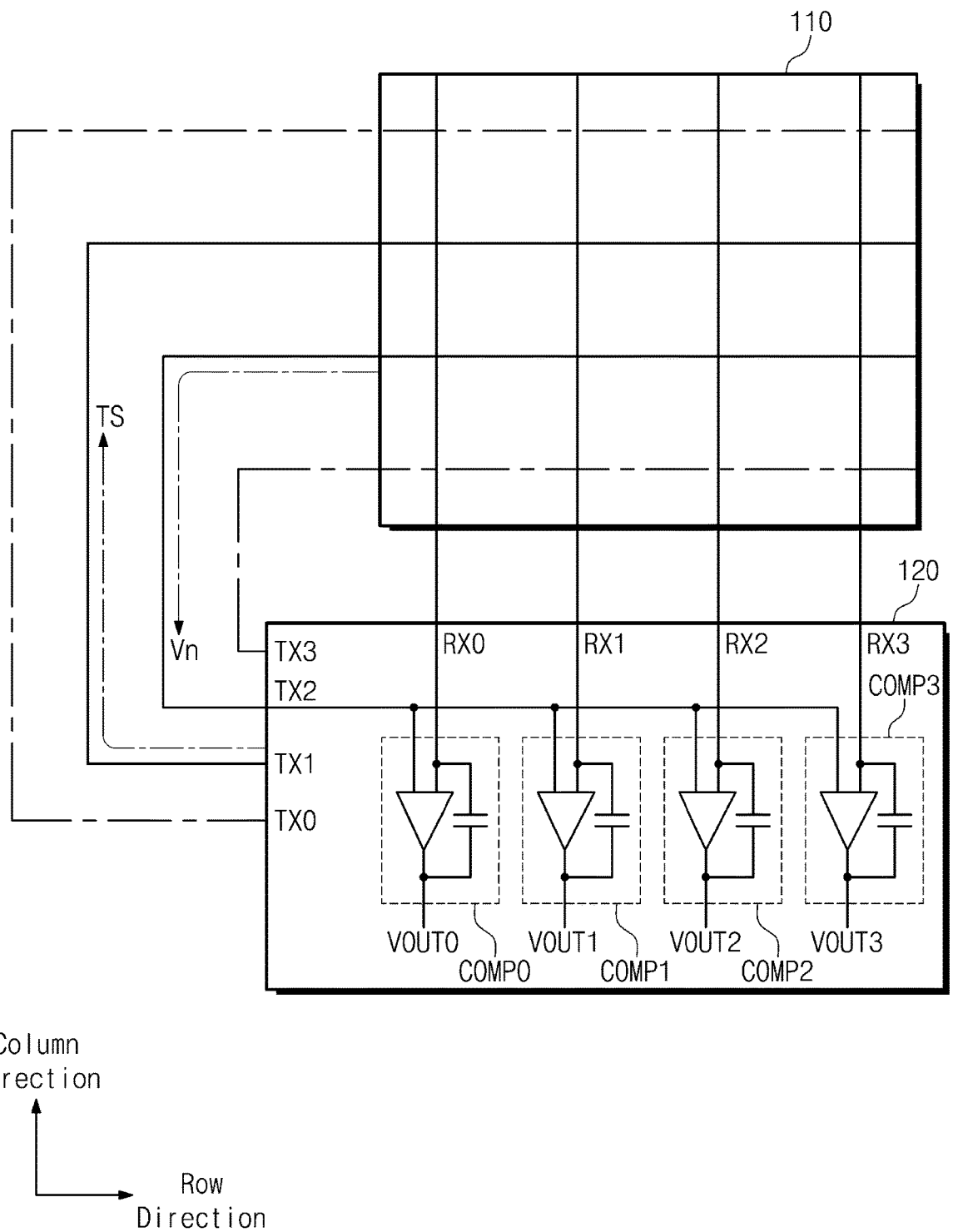
FIG. 7 is a block diagram illustrating a display device, according to an example embodiment of the inventive concept.

FIG. 7 is a block diagram illustrating a display device, according to an example embodiment of the inventive concept. For a brief description, components that are unnecessary to describe the TDI 120 are omitted. In example embodiments, the TDI 120 may further include other components in addition to components illustrated in FIG. 7.

Referring to FIGS. 6 and 7, the display device 100 may include the touch panel 110 and the TDI 120. The touch panel 110 may include the transmission lines TX0 to TX3 and the reception lines RX0 to RX3. The transmission lines TX0 to TX3 and the reception lines RX0 to RX3 are described with reference to FIG. 3, and a detailed description thereof is thus omitted.

The TDI 120 may include a plurality of comparison circuits COMP0 to COMP3. The comparison circuits COMP0 to COMP3 may be configured to cancel a display noise Vn from signals received through the reception lines RX0 to RX3.

For example, as described above, the TDI 120 may provide the touch signal TS to the first transmission line TX1. Afterwards, the TDI 120 may sense a user touch based on signals received through the reception lines RX0 to RX3. In this case, the TDI 120 may sense a user touch at an area in which the first transmission line TX1 and the reception lines RX0 to RX3 cross.

The TDI 120 may detect the display noise Vn through the second transmission line TX2 while the above-described touch sensing operation is performed. For example, as described above, the display noise Vn generated in the display panel 130 may be transferred to the second transmission line TX2 through the second capacitor C2. The TDI 120 may detect the display noise Vn transferred to the second transmission line TX2.

Each of the comparison circuits COMP0 to COMP3 may be configured to receive the display noise Vn detected from the second transmission line TX2. The comparison circuits COMP0 to COMP3 may be configured to receive signals from the reception lines RX0 to RX3, respectively. Each of the comparison circuits COMP0 to COMP3 may be configured to cancel or offset the display noise Vn from a signal from the corresponding one of the reception lines RX0 to RX3 and output the corresponding one of output signals VOUT0 to VOUT3. In example embodiments, the TDI 120 may sense a user touch at an area, in which the first transmission line TX1 and the reception lines RX0 to RX3 cross, based on the output signals VOUT0 to VOUT3.

As described above, the TDI 120 may detect the display noise Vn through the second transmission line TX2 while providing the touch signal TS through the first transmission line TX1. The embodiment illustrated in FIG. 7 is only an example, and embodiments of the inventive concept may not be limited thereto. For example, the TDI 120 may be configured to provide the touch signal TS through the first transmission line TX1 and detect the display noise Vn through the third transmission line TX3. Also, while the touch signal TS is provided to each of the transmission lines TX0 to TX3, the TDI 120 may detect the display noise Vn through one of the transmission lines TX0 to TX3 to which the touch signal TS is not provided. The detected display noise Vn may be provided to the comparison circuit COMP0 to COMP3.

In example embodiments, the above-described display noise Vn may be detected through a separate switching circuit (not illustrated). To provide the touch signal TS to a transmission line on which the touch sensing operation will be performed and detect the display noise Vn by using at least one other transmission line, the separate switching circuit may perform a switching operation on the transmission lines TX0 to TX3.

Figure 8:
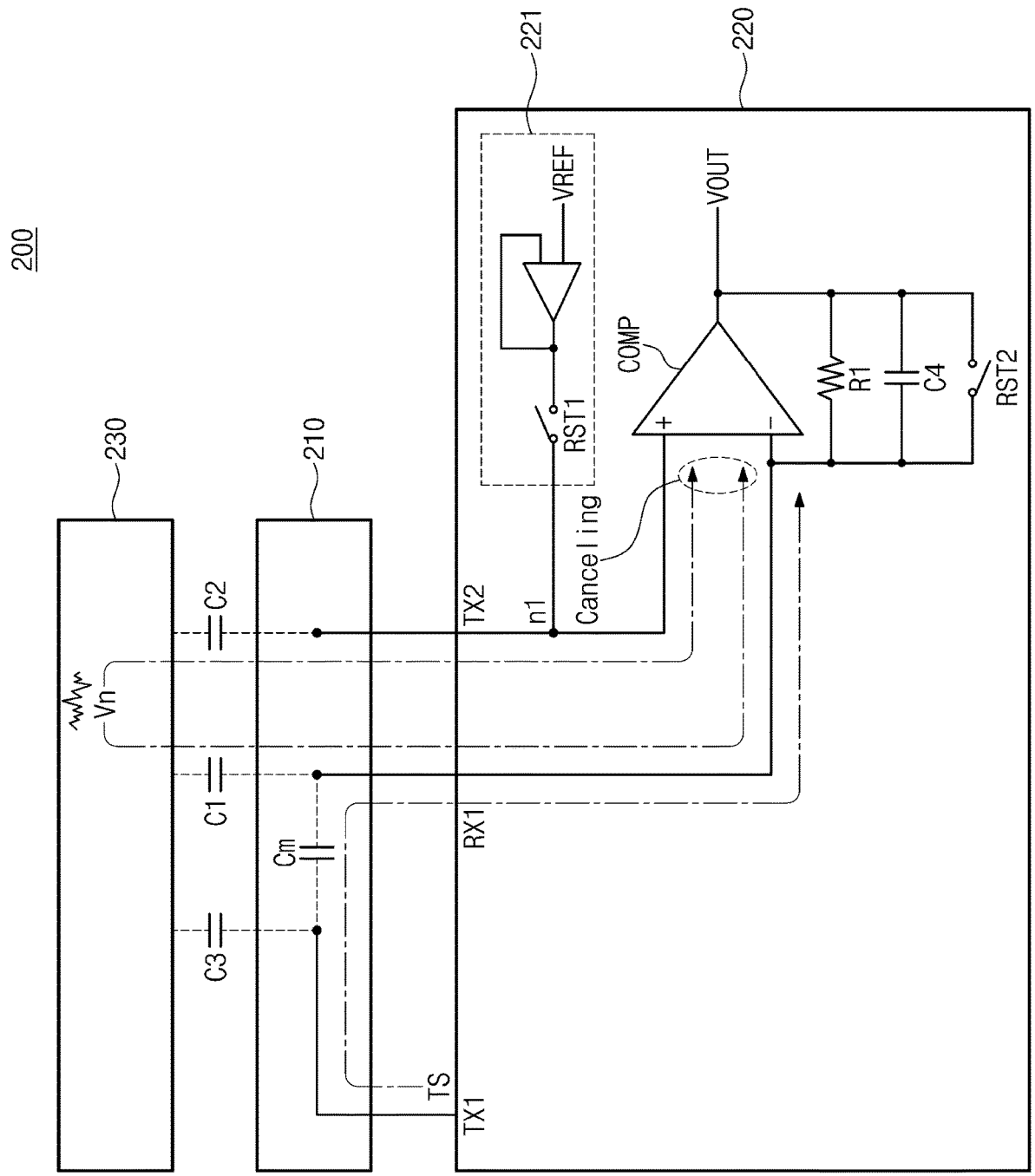
FIG. 8 is a drawing for describing an operation of a TDI, according to an example embodiment of the inventive concept.
Figure 9:
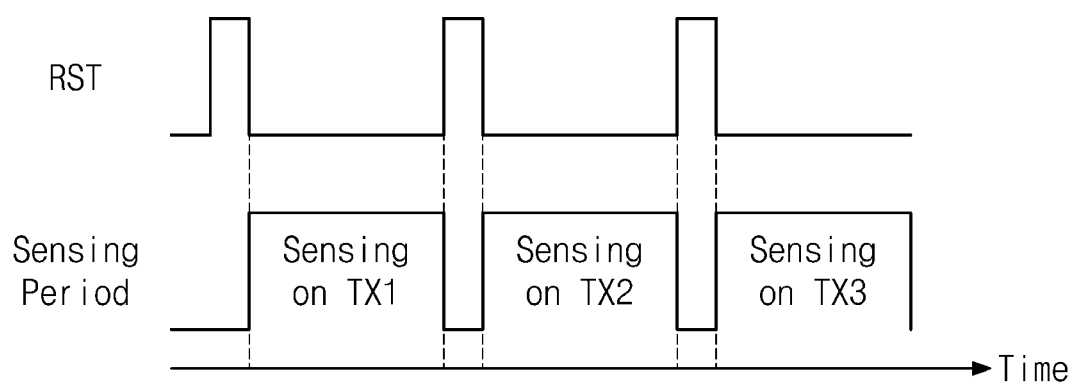
FIG. 9 is a graph for describing an operation of a TDI illustrated in FIG. 8, according to an example embodiment of the inventive concept.

FIG. 8 is a drawing for describing an operation of a TDI, according to an example embodiment of the inventive concept. FIG. 9 is a graph for describing an operation of a TDI illustrated in FIG. 8. For a brief description, components that are unnecessary to describe an operation of a TDI 220 are omitted. Also, for brevity of illustration and for ease of description, as in the above description, it is assumed that the TDI 220 provides a touch signal TS to a first transmission line TX1, receives the touch signal TS through a first reception line RX1, and receives or detects a display noise Vn through the second transmission line TX2. However, embodiments of the inventive concept may not be limited thereto.

Referring to FIGS. 8 and 9, a display device 200 may include a touch panel 210, the TDI 220, and a display panel 230. The TDI 220 may include the comparator COMP, the first resistor R1, the fourth capacitor C4, and a second reset switch RST2. The first resistor R1 and the fourth capacitor C4 are connected in parallel between the second input terminal (−) and the output terminal of the comparator COMP. Some of the components of FIG. 8 are described with reference to FIG. 6, and a detailed description thereof is thus omitted.

The TDI 220 may further include a reference voltage circuit 221. The reference voltage circuit 221 may include a first reset switch RST1. The first reset switch RST1 may adjust a voltage of a first node n1 to a reference voltage VREF in response to a reset signal RST of FIG. 9.

The TDI 220 may repeatedly perform a reset operation and a touch sensing operation as illustrated in FIG. 9. The TDI 220 may perform the reset operation when the reset signal RST is at a high level. The reset operation is performed as follows. When the first reset switch RST1 is turned on, a voltage of the first node n1 may be the reference voltage VREF; when the second reset switch RST2 is turned on, the second terminal (−) and the output terminal of the comparator COMP are reset.

Afterwards, the TDI 220 may perform a touch sensing operation. When the touch sensing operation is performed on the first transmission line TX1, the TDI 220 may provide a touch signal TS to the first transmission line TX1, and receive the touch signal TS through the first reception line RX1. In this case, the TDI 220 may detect and receive a display noise Vn through a second transmission line TX2. During the touch sensing operation, since the TDI 220 receives the detected display noise Vn through the second transmission line TX2, a voltage of the first node n1 may be a sum (i.e., VREF+Vn) of the reference voltage VREF and the display noise Vn.

During the touch sensing operation, a voltage of the first node n1 is provided to the first terminal (+) of the comparator COMP, and a signal (i.e., the touch signal TS and the display noise Vn) received through the first reception line RX1 is provided to the second terminal (−) of the comparator COMP. In this case, the display noise Vn may be offset by the comparator COMP. Accordingly, the comparator COMP may compare a voltage of the touch signal TS with the reference voltage VREF, and output the comparison result as an output signal VOUT. In example embodiments, the TDI 220 may sense a user touch at an area, in which the first transmission line TX1 and the first reception line RX1 cross, based on the output signal VOUT.

In example embodiments, during one touch sensing operation period, the touch sensing operation may be performed on one row (i.e., one transmission line). For example, during one touch sensing operation, the TDI 220 may provide a touch signal TS to the first transmission line TX1, may receive touch signals TS through the reception lines RX0 to RX3 (refer to FIG. 3), and detect a display noise Vn through the second transmission line TX2. The TDI 220 may perform a noise canceling operation on the touch signal TS of each of the reception lines RX0 to RX3 based on the detected display noise Vn, and sense a user touch.

After the touch sensing operation is completely performed on the first transmission line TX1, the TDI 220 may perform a reset operation in response to a reset signal RST. Afterwards, the TDI 220 may perform a touch sensing operation on a next transmission line (e.g., the second transmission line TX2).

In example embodiments, although not illustrated in FIGS. 8 and 9, when the touch sensing operation is performed on the second transmission line TX2, the TDI 220 may provide a touch signal TS to the second transmission line TX2, and receive the touch signal TS from the first reception line RX1. In this case, the TDI 220 may allow the first transmission line TX1 to be connected with a reference voltage circuit 221 through a separate switching circuit (not illustrated). The TDI 220 may receive a display noise Vn through the first transmission line TX1, and cancel or offset the display noise Vn from a signal received through the first reception line RX1 based on the received display noise Vn.

Afterwards, the TDI 220 may perform a reset operation in response to a reset signal RST. Afterwards, the TDI 220 may perform a touch sensing operation on the third transmission line TX3. The touch sensing operation of the third transmission line TX3 is similar to the above-described touch sensing operations, and a detailed description thereof is thus omitted.

As described above, according to an example embodiment of the inventive concept, the TDI may detect a display noise through a transmission line on which the touch sensing operation is not performed. The TDI may cancel or offset the display noise from signals received through a plurality of reception lines based on the detected display noise. Accordingly, a display device with improved reliability may be provided.

Figure 10:
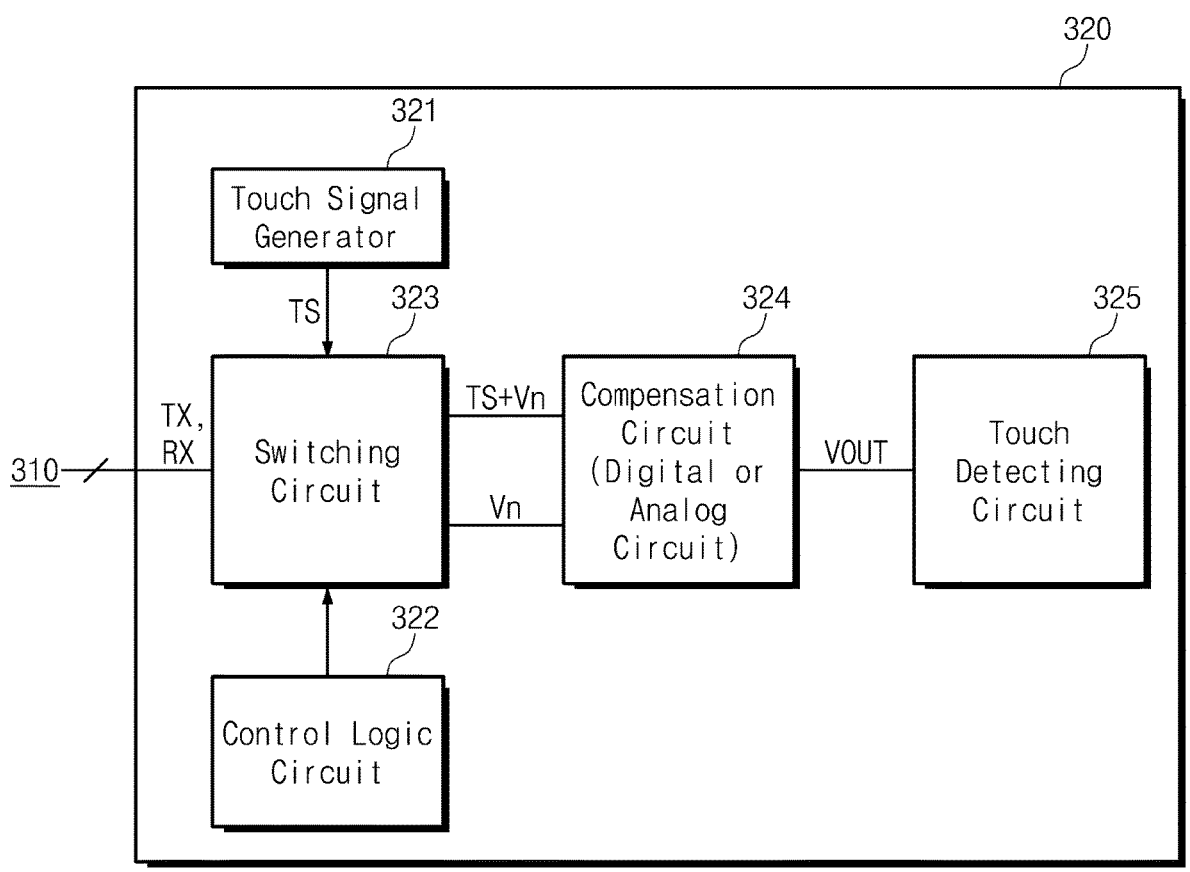
FIG. 10 is a block diagram illustrating a TDI, according to an example embodiment of the inventive concept.

FIG. 10 is a block diagram illustrating a TDI, according to an example embodiment of the inventive concept. Referring to FIG. 10, a TDI 320 may include a touch signal generator 321, a control logic circuit 322, a switching circuit 323, a compensation circuit 324, and a touch detecting circuit 325.

The touch signal generator 321 may be configured to generate a touch signal TS. The touch signal TS may be a signal of a specific level or may be a signal that toggles between specific levels. The control logic circuit 322 may be configured to control the switching circuit 323.

The switching circuit 323 may be connected with a touch panel 310 through a plurality of transmission lines TX and a plurality of reception lines RX. The switching circuit 323 may perform a switching operation on the transmission lines TX and the reception lines RX under control of the control logic circuit 322. For example, under control of the control logic circuit 322, the switching circuit 323 may perform the switching operation such that the touch signal TS is provided to any one of the transmission lines TX and a display noise Vn is received through at least one other transmission line. Under control of the control logic circuit 322, the switching circuit 323 may perform a switching operation such that a signal (TS+Vn) is received from each of the reception lines RX. In example embodiments, the signal (TS+Vn) received from each of the reception lines RX may be a signal that includes the touch signal TS provided to a transmission line and the display noise Vn. The switching circuit 323 may provide the compensation circuit 324 with the received display noise Vn and the signal (TS+Vn) received from each of the reception lines RX.

The compensation circuit 324 may cancel or offset the display noise Vn from the signal (TS+Vn) received from each of the reception lines RX based on received signals, and output an output signal VOUT. The touch detecting circuit 325 may detect a user touch based on the output signal VOUT. In example embodiments, the compensation circuit 324 may be implemented in a form of a digital circuit or an analog circuit.

As described above, the switching circuit 323 of the TDI 320 may be configured to provide the touch signal TS to a transmission line on which the touch sensing operation is performed, and detect or receive the display noise Vn through at least one other transmission line. In example embodiments, the switching circuit 323 may be implemented in the form of a multiplexer/de-multiplexer. However, embodiments of the inventive concept may not be limited thereto.

Figure 11:
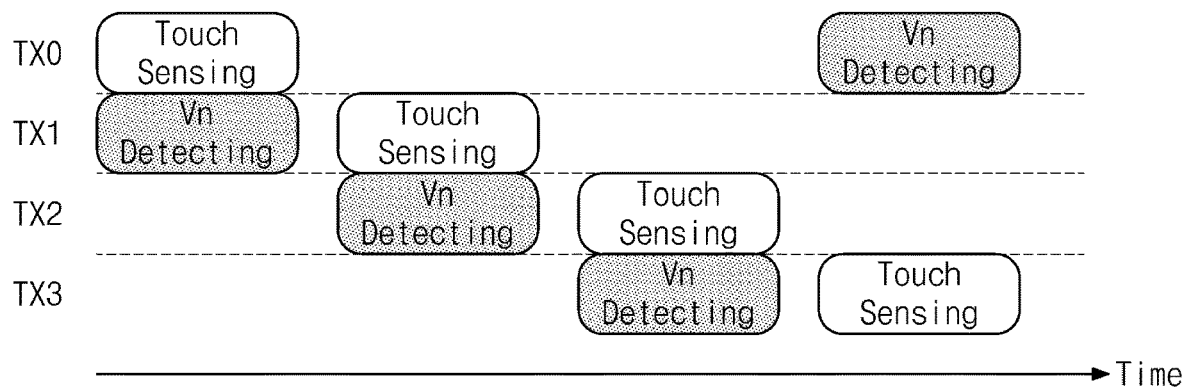
FIGS. 11 to 13 are graphs for describing a touch sensing operation and a display noise detecting operation, according to example embodiments of the inventive concept.
Figure 12:
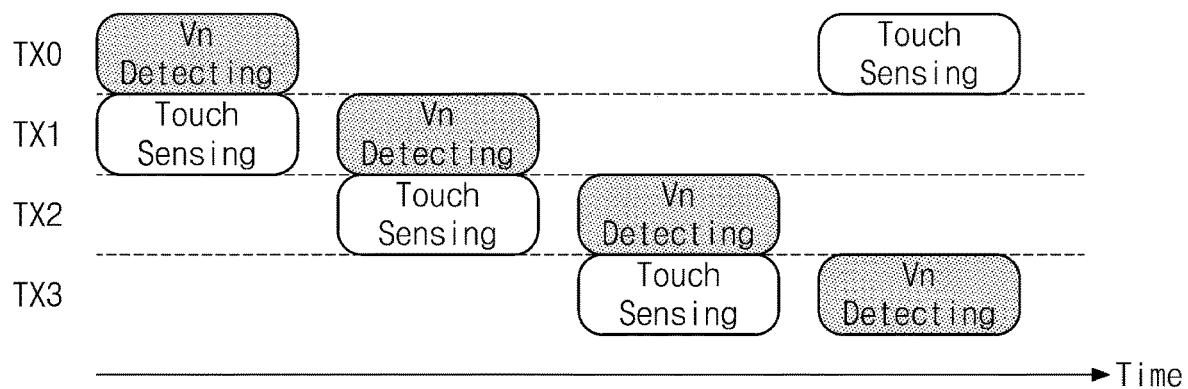
Figure 13:
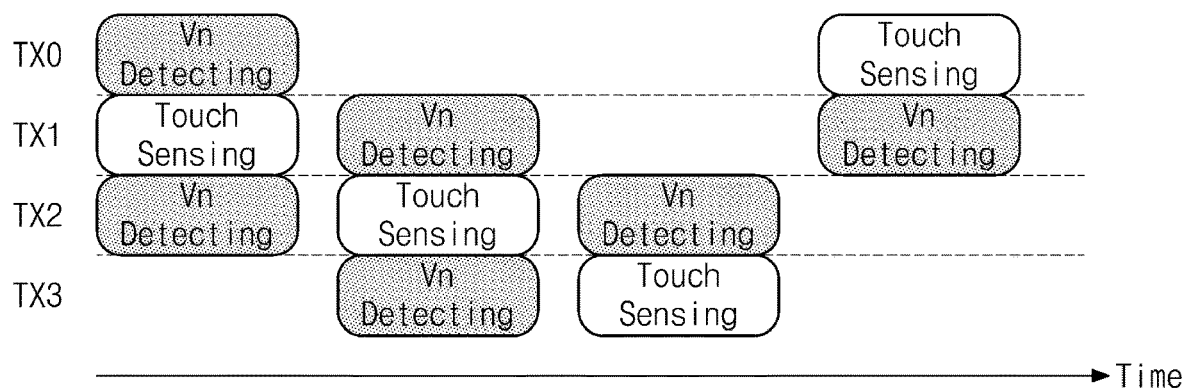

FIGS. 11 to 13 are graphs for describing a touch sensing operation and a display noise detecting operation, according to example embodiments of the inventive concept. For a brief description, components that are unnecessary to describe a touch sensing operation and a display noise detecting operation are omitted. Also, embodiments illustrated in FIGS. 11 to 13 will be described with reference to components illustrated in FIG. 5. Also, it is assumed that touch sensing operations of the transmission lines TX0 to TX3 are sequentially performed. To perform a touch sensing operation on a specific transmission line means to provide a touch signal to the specific transmission line and sense a user touch of an area at which the specific transmission line is located. In other words, the TDI 120 may sequentially provide a touch signal TS to the transmission lines TX0 to TX3. However, embodiments of the inventive concept may not be limited thereto.

First, referring to FIGS. 5 and 11, the TDI 120 may perform a touch sensing operation on the 0th transmission line TX0, and detect a display noise Vn through the first transmission line TX1. In example embodiments, the first transmission line TX1 may be a transmission line adjacent to the 0th transmission line TX0. Alternatively, the first transmission line TX1 may be a transmission line on which a touch sensing operation is performed after the touch sensing operation on the 0th transmission line TX0.

Afterwards, the TDI 120 may perform the touch sensing operation on the first transmission line TX1, and detect a display noise Vn through the second transmission line TX2. In example embodiments, the second transmission line TX2 may be a transmission line adjacent to the first transmission line TX1. Alternatively, the second transmission line TX2 may be a transmission line on which a touch sensing operation is performed after the touch sensing operation on the first transmission line TX1.

Likewise, the TDI 120 may perform the touch sensing operation on the second transmission line TX2, and detect the display noise Vn through the third transmission line TX3. The TDI 120 may perform a touch sensing operation on the third transmission line TX3, and detect a display noise Vn through the 0th transmission line TX0. In this case, the third and 0th transmission lines TX3 and TX0 may be transmission lines on which touch sensing operations are respectively performed after the touch sensing operations on the second and third transmission lines TX2 and TX3.

As described above, the TDI 120 may be configured to detect the display noise Vn through a transmission line that corresponds to a target of a next touch sensing operation.

Next, referring to FIGS. 5 and 12, the TDI 120 may perform a touch sensing operation on the first transmission line TX1, and detect a display noise Vn through the 0th transmission line TX0. In example embodiments, the 0th transmission line TX0 may be a transmission line that corresponds to a target of a previously performed touch sensing operation.

Likewise, the TDI 120 may perform a touch sensing operation on the second transmission line TX2, and detect a display noise Vn through the first transmission line TX1. The TDI 120 may perform a touch sensing operation on the third transmission line TX3, and detect a display noise Vn through the second transmission line TX2. The TDI 120 may perform a touch sensing operation on the 0th transmission line TX0, and detect a display noise Vn through the third transmission line TX3.

As described above, the TDI 120 may be configured to detect the display noise Vn through a transmission line that corresponds to a target of a previously performed touch sensing operation.

Next, referring to FIGS. 5 and 13, the TDI 120 may perform a touch sensing operation on the first transmission line TX1, and detect a display noise Vn through the 0th and second transmission lines TX0 and TX2. In example embodiments, the 0th and second transmission lines TX0 and TX2 may be transmission lines adjacent to the first transmission line TX1.

Likewise, the TDI 120 may perform a touch sensing operation on the second transmission line TX2, and detect a display noise Vn through the first and third transmission line TX1 and TX3.

The TDI 120 may perform a touch sensing operation on the third transmission line TX3, and detect a display noise Vn through the second transmission line TX2 adjacent to the third transmission line TX3. The TDI 120 may perform a touch sensing operation on the 0th transmission line TX0, and detect a display noise Vn through the first transmission line TX1 adjacent to the 0th transmission line TX0.

As described above, the TDI 120 may be configured to detect the display noise Vn through a transmission line that is adjacent to a transmission line on which a touch sensing operation is currently performed. Although not illustrated in FIGS. 11 to 13, the touch panel 110 may further include a first dummy transmission line adjacent to the 0th transmission line TX0. Even though a touch sensing operation is not performed on the first dummy transmission line, the TDI 120 may detect a display noise Vn through the first dummy transmission line and the first transmission line TX1 while performing a touch sensing operation on the 0th transmission line TX0. The touch panel 110 may further include a second dummy transmission line adjacent to the third transmission line TX3. Even though a touch sensing operation is not performed on the second dummy transmission line, the TDI 120 may detect a display noise Vn through the second dummy transmission line and the second transmission line TX2 while performing a touch sensing operation on the third transmission line TX3.

In example embodiments, the above-described display noise detecting method is only an example, and embodiments of the inventive concept may not be limited thereto. For example, the display noise detecting method may be variously modified.

Figure 14:
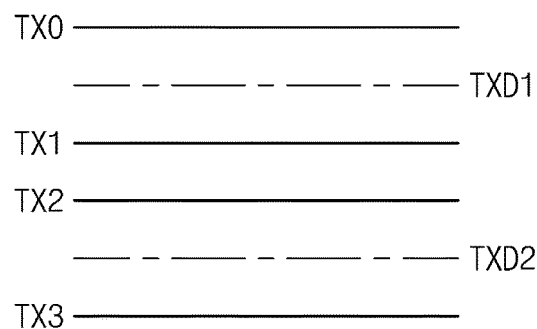
FIG. 14 is a drawing illustrating a configuration of the a touch panel, according to an example embodiment of the inventive concept.
Figure 15:
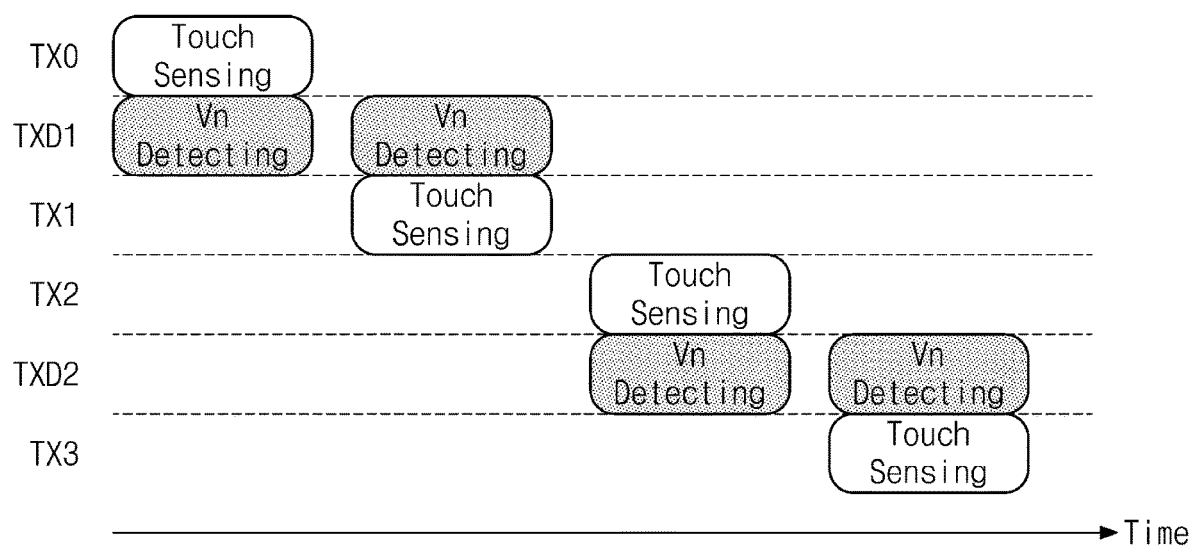
FIG. 15 is a drawing illustrating a display noise detecting method using a touch panel of FIG. 14, according to an example embodiment of the inventive concept.

FIG. 14 is a drawing illustrating a configuration of a touch panel, according to an example embodiment of the inventive concept. FIG. 15 is a drawing illustrating a display noise detecting method using a touch panel of FIG. 14. For a brief description, components that are unnecessary to describe embodiments of FIGS. 14 and 15 are omitted.

Referring to FIGS. 5, 14, and 15, a touch panel 410 may include a plurality of transmission lines TX0 to TX3 and first and second dummy transmission lines TXD1 and TXD2. In example embodiments, the first dummy transmission line TXD1 may be arranged between the 0th and first transmission lines TX0 and TX1. The second dummy transmission line TXD2 may be arranged between the second and third transmission lines TX2 and TX3.

In example embodiments, the first and second dummy transmission lines TXD1 and TXD2 may be dedicated lines for detecting a display noise Vn. That is, the TDI 120 (refer to FIG. 5) may be configured to perform a touch sensing operation on each of the transmission lines TX0 to TX3, and detect the display noise Vn through the first and second dummy transmission lines TXD1 and TXD2.

For example, as illustrated in FIG. 15, the TDI 120 may perform a touch sensing operations on each of the 0th and first transmission lines TX0 to TX1. In this case, the TDI 120 may detect a display noise Vn through the first dummy transmission line TXD1. The first dummy transmission line TXD1 may be a transmission line that is adjacent to the 0th and first transmission lines TX0 and TX1. Alternatively, the first dummy transmission line TXD1 may be a transmission line, which is the closest to the 0th and first transmission lines TX0 and TX1, of a plurality of dummy transmission lines.

Likewise, the TDI 120 may perform a touch sensing operation on each of the second and third transmission lines TX2 to TX3. In this case, the TDI 120 may detect a display noise Vn through the second dummy transmission line TXD2. The second dummy transmission line TXD2 may be a transmission line that is adjacent to the second and third transmission lines TX2 and TX3. Alternatively, the second dummy transmission line TXD2 may be a transmission line, which is the closest to the second and third transmission lines TX2 and TX3, of the plurality of dummy transmission lines.

Although not illustrated in FIG. 14, the arrangement of the dummy transmission lines TXD1 and TXD2 may not be limited to FIG. 14. A touch panel may further include a plurality of transmission lines and a plurality of dummy transmission lines, which are arranged in various manners.

As described above, according to an example embodiment of the inventive concept, the touch panel may include a dummy transmission line, and the TDI may detect a display noise through the dummy transmission line.

Figure 16:
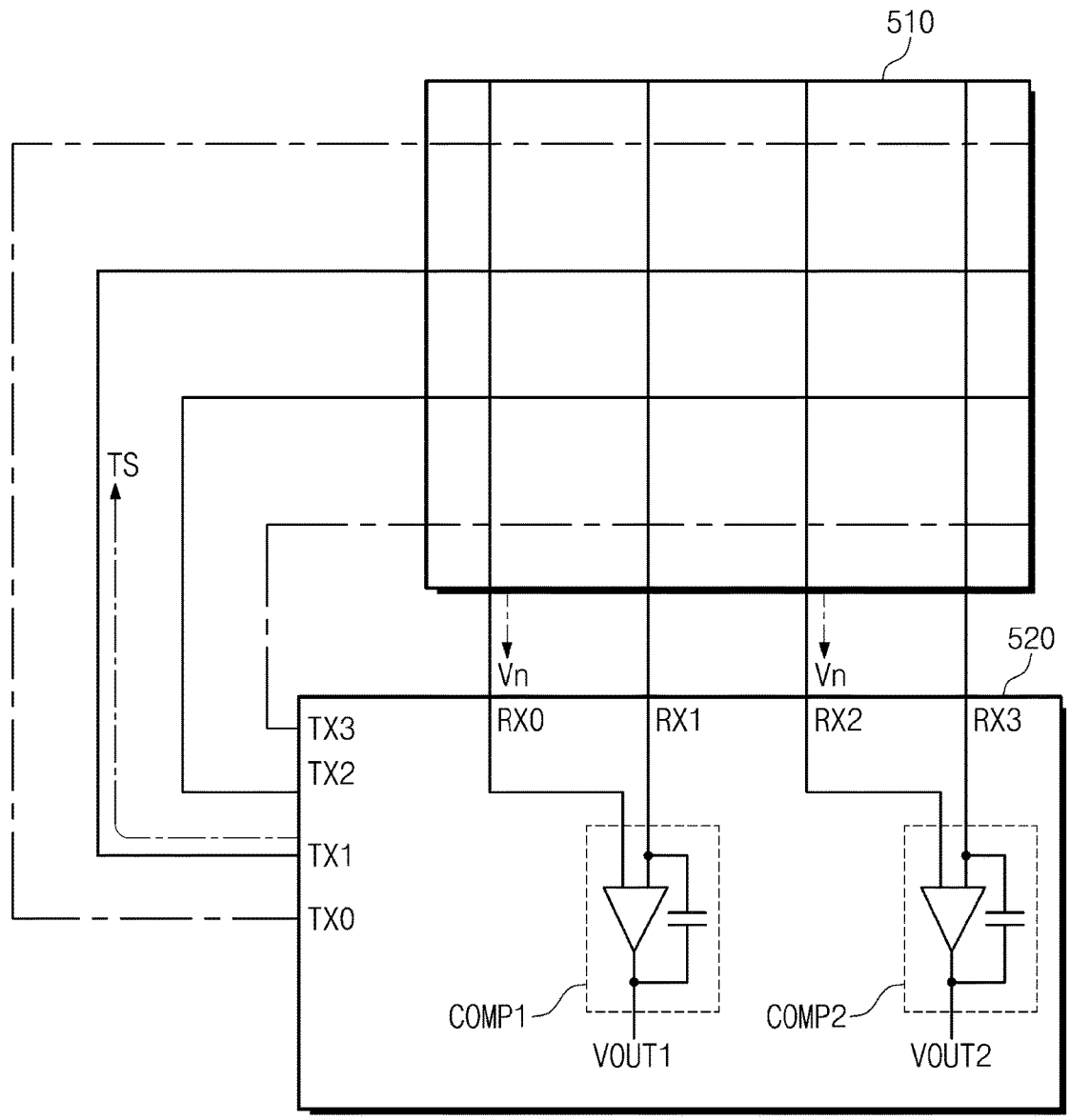
FIG. 16 is a block diagram illustrating a display device, according to an example embodiment of the inventive concept.

FIG. 16 is a block diagram illustrating a display device, according to an example embodiment of the inventive concept. In example embodiments, an embodiment in which the display noise Vn is detected through a reception line RX will be described with reference to FIG. 16. In example embodiments, components that are unnecessary to describe an embodiment in which the display noise Vn is detected through a reception line RX are omitted. Also, a detailed description of components, which are described above, of components of FIG. 16 is omitted.

Referring to FIG. 16, a display device 500 may include a touch panel 510 and a TDI 520. The touch panel 510 may include transmission lines TX0 to TX3 and reception lines RX0 to RX3.

The TDI 520 may include first and second comparison circuits COMP1 and COMP2. The first and second comparison circuits COMP1 and COMP2 may be configured to cancel a display noise Vn from signals received through the reception lines RX1 and RX3.

For example, in the embodiments described with reference to FIGS. 1 to 15, the display noise Vn is detected through a transmission line on which a touch sensing operation is not performed. However, in example embodiments of FIG. 16, the TDI 520 may be configured to detect the display noise Vn through some (e.g., RX0 and RX2) of the reception lines RX0 to RX3.

The first comparison circuit COMP1 may use the display noise Vn detected and received through the 0th reception line RX0 to cancel or offset the display noise Vn from a signal received through the first reception line RX1, and output a first output signal VOUT1. The second comparison circuit COMP2 may used the display noise Vn detected and received through the second reception line RX2 to cancel or offset the display noise Vn from a signal received through the third reception line RX3, and output a second output signal VOUT2.

As described above, the TDI 520 may detect the display noise Vn through some of a plurality of reception lines, and perform a noise canceling operation based on the detected display noise Vn. Although not illustrated in detail in FIG. 16, for the above-described display noise detecting operation, the TDI 520 may perform a switching operation on a plurality of reception lines through a separate switching circuit (e.g., the switching circuit 323 of FIG. 10).

In example embodiments, the 0th and second reception lines RX0 and RX2 may be dummy reception lines that are not used for the touch sensing operation, and used to detect the display noise Vn. Alternatively, the TDI 120 may receive touch signals from the 0th and second reception lines RX0 and RX2 by the separate switching circuit, and detect the display noise Vn through the first and third transmission line RX1 and RX3 by the separate switching circuit. However, embodiments of the inventive concept may not be limited thereto.

Figure 17:
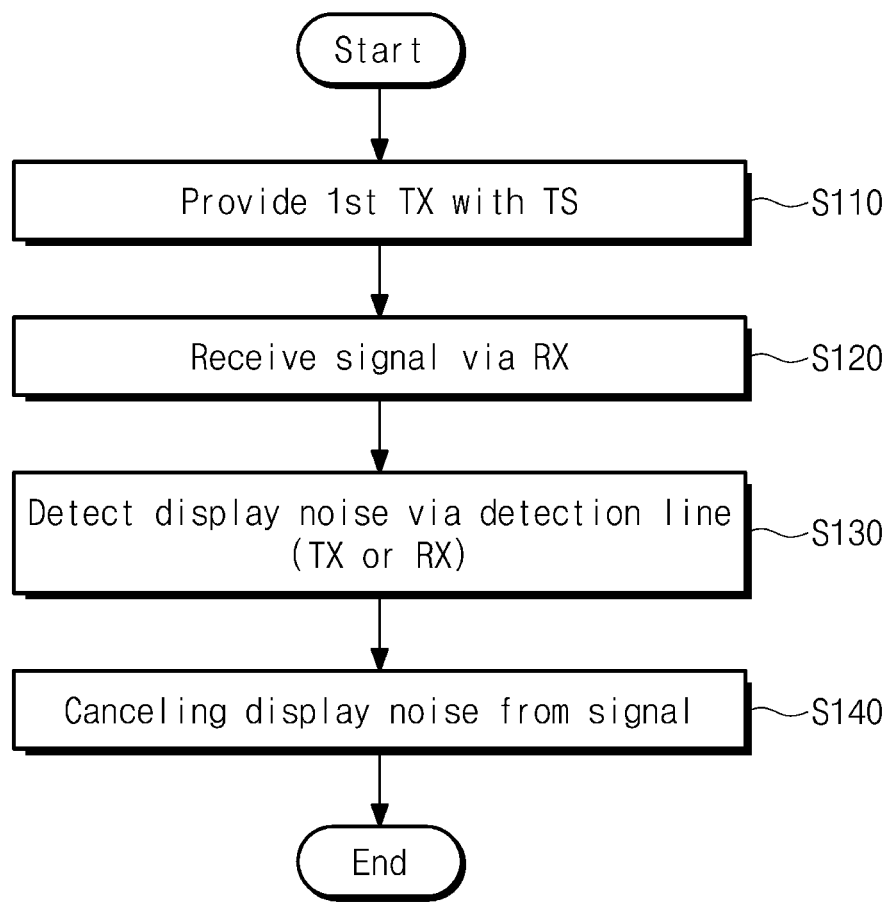
FIG. 17 is a flowchart illustrating an operating method of a TDI, according to an example embodiment of the inventive concept.

FIG. 17 is a flowchart illustrating an operating method of a TDI, according to an example embodiment of the inventive concept. For a brief description, a detailed description of the above-described components or contents is omitted. Also, the operating method of FIG. 17 will be described with reference to the TDI 120 illustrated in FIG. 5, but an operation of FIG. 17 may be performed by the TDI 220, 320, 420 or 520 disclosed in this specification or other components.

Referring to FIGS. 5 and 17, in operation S110, the TDI 120 may provide the touch signal TS to the first transmission line TX1. In example embodiments, the touch signal TS may be a signal for sensing a user touch on the touch panel 110.

In operation S120, the TDI 120 may receive a signal through the reception line RX. For example, as described above, the TDI 120 may receive the touch signal TS, which is provided to the first transmission line TX1, through a plurality of reception lines RX. In example embodiments, the signal received through the reception line RX may be a sensing signal.

In operation S130, the TDI 120 may detect the display noise Vn through a detection line. In example embodiments, the detection line may indicate, as described above, a transmission line or a reception line on which the touch sensing operation is not performed. For example, the TDI 120 may detect the display noise Vn generated in the display panel 130 (or a display noise transferred to the touch panel 110) through the second transmission line TX2 on which the touch sensing operation is not performed. In example embodiments, as described above, the TDI 120 may detect the display noise Vn through some of the reception lines RX0 to RX3.

In operation S140, the TDI 120 may cancel or offset the display noise Vn detected from the signals received through the reception line RX. In example embodiments, the TDI 120 may determine whether a user touch is made, based on the signals from which the display noise Vn is canceled.

Figure 18:
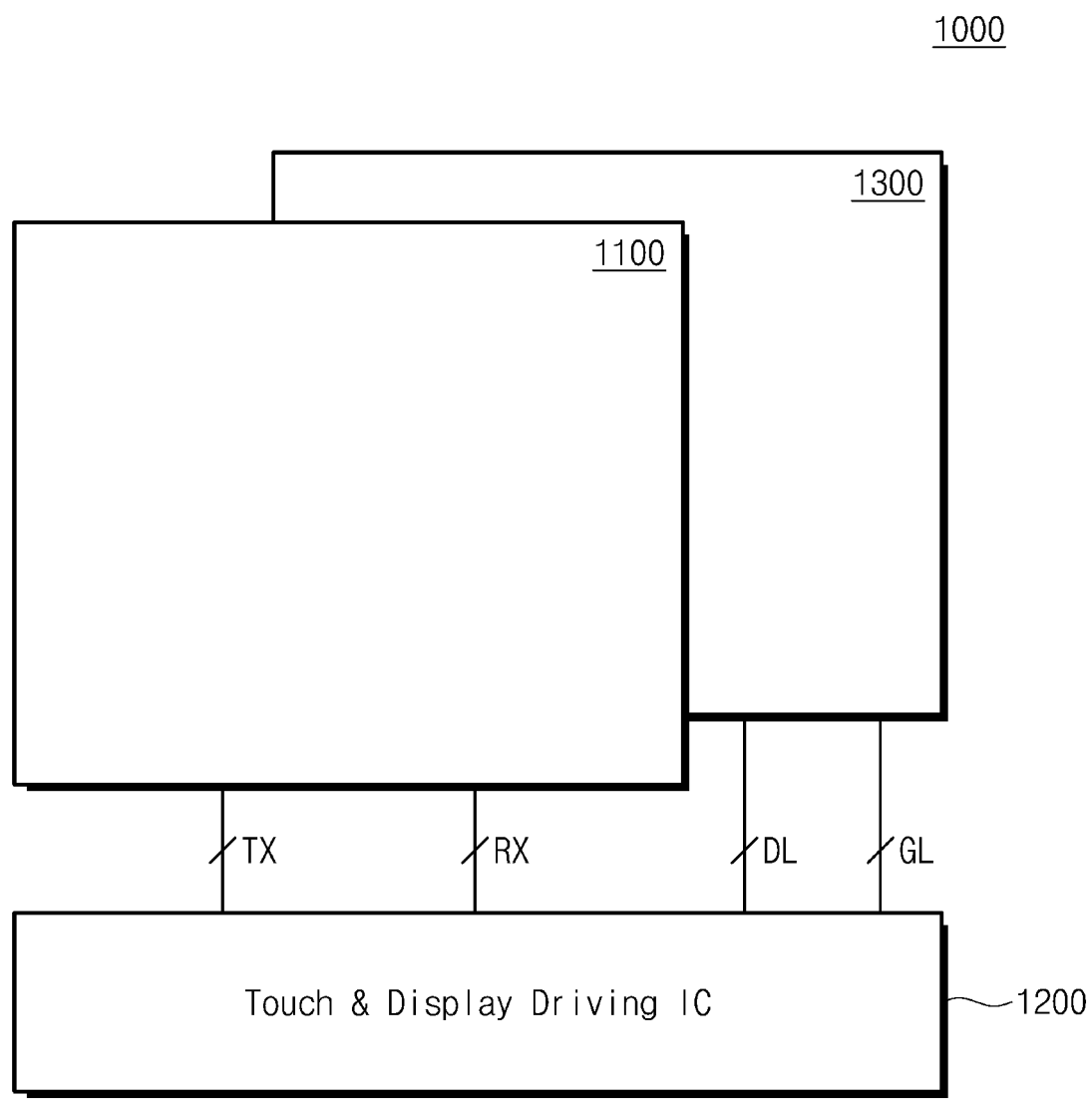
FIG. 18 is a block diagram illustrating a display device, according to an example embodiment of the inventive concept.

FIG. 18 is a block diagram illustrating a display device, according to an example embodiment of the inventive concept. Referring to FIG. 18, a display device 1000 may include a touch panel 1100, a touch and display driving integrated circuit (TDDI) 1200, and a display panel 1300.

The touch panel 1100 and the display panel 1300 of FIG. 18 are described with reference to FIG. 1, and a detailed description thereof is thus omitted. In example embodiments, the touch panel 1100 and the display panel 1300 may be implemented in an on-cell type, an out-cell type, or an in-cell type. That is, the touch panel 1100 and the display panel 1300 may be formed on separate silicon substrates or the same silicon substrate.

The TDDI 1200 of FIG. 18 may be configured to perform functions of the TDI 120 and the DDI 140 of FIG. 1. For example, the TDDI 1200 may be connected with the touch panel 1100 through a plurality of transmission lines TX and a plurality of reception lines RX, and sense a user touch based on the operating method described with reference to FIGS. 1 to 18. The TDDI 1200 may be connected with the display panel 1300 through a plurality of data lines DL and a plurality of gate lines GL, and display image information on the display panel 1300 by controlling the data lines DL and the gate lines GL, respectively.

Figure 19:
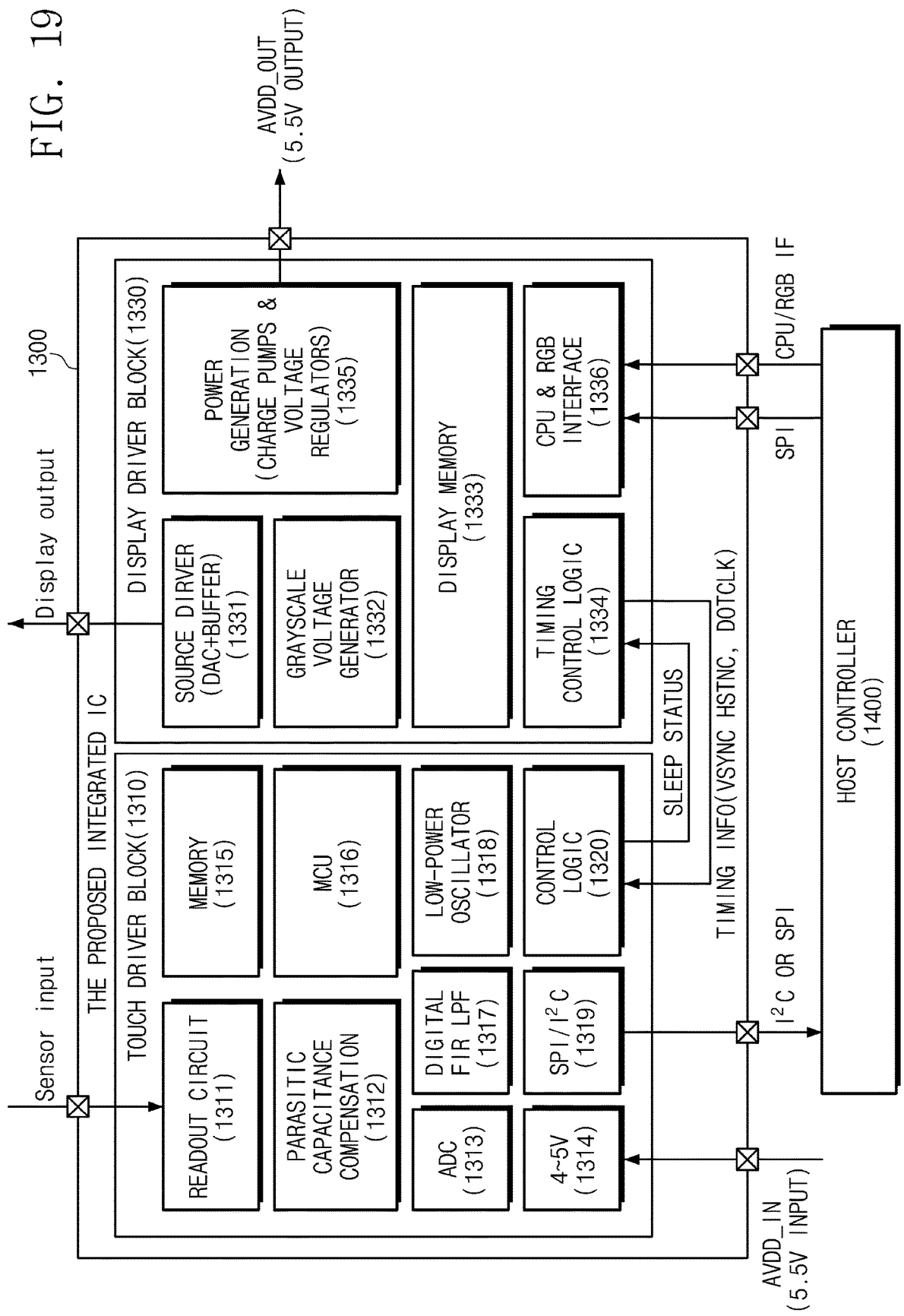
FIG. 19 is a block diagram illustrating a touch and display driving integrated circuit (TDDI) of FIG. 18 in detail, according to an example embodiment of the inventive concept.

FIG. 19 is a block diagram illustrating a TDDI of FIG. 18 in detail. The TDDI of FIG. 19 may be an example, and embodiments of the inventive concept may not be limited thereto. Referring to FIG. 19, an integrated circuit 1300 may include a touch driver block 1310 operating as a touch driver and a display driver block 1330 operating as a source driver (or a gate driver or a display driver).

Manufacturing costs may be reduced by integrating the touch driver block 1310 and the display driver block 1330 in one semiconductor chip, one semiconductor die, or one semiconductor package. In example embodiments, influence of noise at a touch screen operation may be reduced by synchronizing a sensing signal of the touch driver block 1310 with a signal generated by the display driver block 1330.

The touch driver block 1310 may include various components for touch screen operation. For example, the touch driver block 1310 may include a readout circuit 1311, a parasitic capacitance compensation part 1312, an analog-to-digital converter (ADC) 1313, a power supply voltage generation part 1314, a memory 1315, a micro control unit (MCU) 1316, a digital finite impulse response low-pass filter (FIR LPF) 1317, an oscillator 1318, an interface part 1319, and control logic 1320.

The readout circuit 1311 may generate touch data. The parasitic capacitance compensation part 1312 may reduce or compensate for parasitic capacitance components of a sensing unit. The ADC 1313 may convert analog data into a digital signal. The power supply voltage generation part 1314 may generate a power supply voltage. The oscillator 1318 may generate a low-power oscillation signal. The interface part 1319 may exchange signals with a host controller 1400.

In example embodiments, during a touch sensing operation, the touch driver block 1310 may detect a display noise based on the operating method described with reference to FIGS. 1 to 17, and cancel the detected display noise.

The display driver block 1330 may include a source driver part 1331, a grayscale voltage generation part 1332, a memory 1333, timing control logic (TCON) 1334, a power supply voltage generation part 1335, a central processing unit (CPU) and interface part 1336.

The source driver part 1331 may generate grayscale data. The memory 1333 may store display data. The timing control logic 1334 may generate a control signal (or a synchronization signal) for controlling each component of the display driver block 1330. The power supply voltage generation part 1335 may generate one or more power supply voltages. The CPU and interface part 1336 may control overall operations of the display driver block 1330 or may communicate with the host controller 1400.

The touch driver block 1310 may receive at least one timing information signal from the display driver block 1330. For example, the control logic 1320 of the touch driver block 1310 receives various timing information (e.g., VSYNC, HSYNC, and DOTCLK) that are synchronized with a display output signal from the timing control logic 1334 of the display driver block 330. The control logic 1320 may generate a control signal for controlling a generation time point of touch data by using the received timing information.

Figures 20, 21:
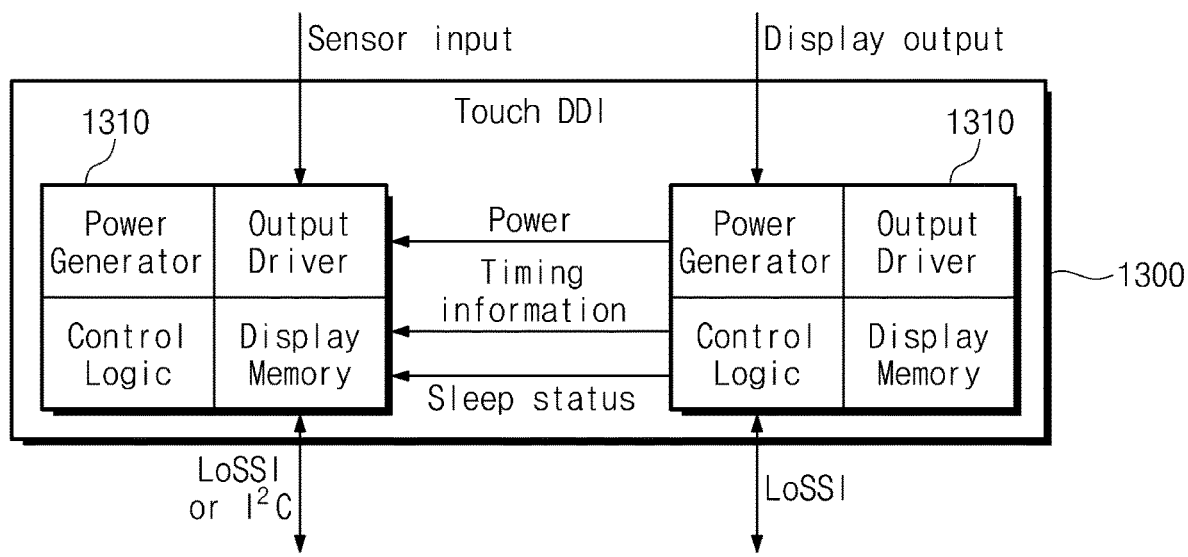
FIGS. 20 and 21 are drawings illustrating timing and power supply voltage relationships between a touch driver block and a display driver block of FIG. 19, according to example embodiments of the inventive concept.

In example embodiments, the display driver block 330 may receive at least one information signal from the touch driver block 1310. For example, as illustrated in FIG. 20, the display driver block 1330 may receive a status signal (e.g., a sleep status signal) from the touch driver block 1310. The display driver block 1330 may perform an operation corresponding to the sleep status signal received from the touch driver block 1310.

That the touch driver block 1310 is at a sleep state indicates that a touch operation is not performed during a time period. In this case, the display driver block 1330 may interrupt an operation of providing timing information to the touch driver block 1310, thereby making it possible to efficiently use power of a device (e.g., a mobile device) including the integrated circuit 1300.

As illustrated in FIG. 19, each of the touch driver block 1310 and the display driver block 1330 includes a circuit block that generates power, a memory that stores data, and a control unit that controls functions of the blocks. As such, in the case where the touch driver block 1310 and the display driver block 1330 are integrated in one semiconductor chip, the memory, the circuit block, the control logic, etc. may be implemented to be shared by the touch driver block 330 and the display driver block 1330.

FIGS. 20 and 21 are drawings illustrating timing and power supply voltage relationships between the touch driver block 1310 and the display driver block 1330 of FIG. 19. Referring to FIGS. 19 to 21, as illustrated in FIGS. 19 and 20, the TDDI 1300 for driving a touch display device may include the touch driver block 1310 and the display driver block 1330. The touch driver block 1310 and the display driver block 1330 may exchange at least one of timing information, status information, etc. with each other. Also, the touch driver block 1310 may provide or receive a power supply voltage to or from the display driver block 1330 and vice versa.

For convenience of description and for ease of illustration, the simplified touch driver block 1310 and the simplified display driver block 1330 are illustrated in FIG. 20, but an analog front end (AFE) included in the touch driver block 1310 may be a block that includes a voltage readout circuit, an amplification circuit, an integration circuit, an ADC, etc.

The touch driver block 1310 of the display device according to an example embodiment of the inventive concept may provide sleep status information to the display driver block 1330. In example embodiments, also, an operation in which a power supply voltage used in the touch driver block 1310 is provided from the display driver block 1330 is as follows.

As illustrated in FIG. 21, in a case where a touch input does not operate while a screen is turned off (in a case where the blocks 1310 and 1330 all are at a sleep state), the display driver block 1330 may block provision of the power supply voltage or timing information to the touch driver block 1310. In this case, the display driver block 1330 may maintain only a status of a register therein at a previous state. Accordingly, power consumption may be minimized.

In the case where a touch input is deactivated and only a display is activated (in a case where a touch panel is in a sleep state, and a display panel is in a normal state), the display driver block 1330 may generate a power supply voltage for its own consumption, but the display driver block 1330 may not provide the power supply voltage to the touch driver block 1310 because the touch driver block 1310 does not consume power. Also, the display driver block 1330 may not provide timing information to the touch driver block 310.

In a case where the touch input is activated and the display is inactivated (in a case where the touch panel is in a normal state and the display panel is in a sleep state), since the touch input is activated, whether a touch operation is performed is determined periodically. In this case, the display driver block 1330 operates in a low-power mode and maintains an inactive state. However, to determine whether the touch operation is performed, the display driver block 1330 may generates timing information and a power supply voltage to be used in the touch driver block 1310, and provide the timing information and the power supply voltage to the touch driver block 1310.

Meanwhile, as a normal case, in a case where both the touch input and the display are activated (in a case where both the touch panel and the display panel are in a normal state), the display driver block 1330 may generate timing information and a power supply voltage, and provide the timing information and the power supply voltage to the touch driver block 1310.

It may be understood from the above-described four cases that a power generator of the display driver block 1330 generates a power supply voltage when at least one of the touch driver block 1310 and the display driver block 1330 is activated. Also, control logic of the display driver block 1330 may generate timing information only when the touch driver block 1310 operates and provide the timing information to the touch driver block 1310.

In example embodiments, a related art touch driving circuit uses a separate external capacitor to detect a display noise. However, a difference is made between an actual display noise generated at a location in which the display noise is generated and a display noise detected by the external capacitor, and thus, it may be impossible to effectively cancel a noise. Also, a separate hardware pin or the external capacitor causes increase in costs and areas. However, according to an example embodiment of the inventive concept, the TDI 120 may detect a display noise through some of transmission lines or reception lines included in the touch panel 110, thereby reducing costs resulting from additional components. Also, since a display noise is detected in an area adjacent to an area in which a touch sensing operation is performed, a difference between an actual display noise and a detected display noise may be minimized. Accordingly, a touch driving integrated circuit with improved reliability and reduced costs and a touch display device including the same are provided.

According to an example embodiment of the inventive concept, it may be possible to detect and compensate for a display noise generated in a display panel. A touch display device with improved reliability and an operating method thereof may be provided.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units represented by a block as illustrated in FIGS. 10, 19 and 20 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. At least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An operating method of a touch driving integrated circuit (TDI) sensing a user touch or proximity on a touch panel, the method comprising:
   transmitting a first touch signal through a first transmission line connected to the touch panel;
   receiving a first sensing signal including a first display noise through a reception line connected to the touch panel;
   receiving a second display noise through a detection line connected to the touch panel; and
   offsetting the first display noise included in the first sensing signal by using the second display noise,
   wherein the detection line is a second transmission line which is adjacent to the first transmission line and connected to the touch panel,
   wherein, during transmission of the first touch signal, the TDI does not transmit a touch signal sensing the user touch or proximity to the second transmission line.

2. The method of claim 1, further comprising determining an area of the user touch or proximity on the touch panel based on the first sensing signal from which the first display noise is canceled,
   wherein the area corresponds to a point where the first transmission line and the reception line cross or overlap.

3. The method of claim 1, wherein the method further comprises:
   transmitting a second touch signal through the second transmission line;
   receiving a second sensing signal including a third display nose through the reception line;
   receiving a fourth display noise through the first transmission line; and
   offsetting the third display noise included in the second sensing signal by using the fourth display noise.

4. The method of claim 1, wherein the second transmission line is a dummy transmission line which extends in a same direction as the first transmission line.

5. The method of claim 1, wherein the first sensing signal further comprises
   the first touch signal, which is received through the first transmission line, a mutual capacitor disposed between the first transmission line and the reception line, and the reception line, and
   wherein the first display noise received through the reception line is equal to an amount of the second display noise.

6. The method of claim 1, wherein the method further comprises:
   receiving a second sensing signal through the detection line;
   receiving a second display noise through the reception line; and
   offsetting a noise included in the second sensing signal by using the second display noise.

7. The method of claim 1, wherein each of the first display noise and the second display noise is generated in an external display panel and is transferred to the touch panel.

8. A touch display device comprising:
- a display panel comprising a plurality of pixels;
- a touch panel comprising a plurality of transmission lines extending in a row direction and a plurality of reception lines extending in a column direction; and
- a touch driving integrated circuit (TDI) configured to provide a touch signal to a first transmission line among the plurality of transmission lines, receive sensing signals including a display noise, which is transferred from the display panel to the touch panel, through the plurality of reception lines, detect the display noise through a second transmission line among the plurality of transmission lines, to offset the display noise included in the sensing signals by using the display noise detected through the second transmission line, and sense a user touch or proximity on the touch panel based on the sensing signals from which the display noise are offset,
- wherein during the touch signal being transmitted to the first transmission line, the TDI does not transmit the touch signal to the second transmission line.

9. The touch display device of claim 8, wherein the TDI comprises:
- a touch signal generator configured to generate the touch signal; and
- a switching circuit connected to the plurality of transmission lines and the plurality of reception lines,
- wherein the switching circuit is configured to perform a switching operation such that the touch signal is provided to the first transmission line, the sensing signals are received through the plurality of reception lines, and the display noise is detected through the second transmission line, and output the display noise and the sensing signals.

10. The touch display device of claim 9, wherein the TDI further comprises:
- a compensation circuit configured to receive the display noise and the sensing signals from the switching circuit, offset the display noise included in the received sensing signals by using the display noise detected through the second transmission line, and output an output signal; and
- a touch detecting circuit configured to determine whether the user touch or proximity is made, based on the output signal.

11. The touch display device of claim 8, wherein the TDI comprises a reference voltage circuit configured to reset a voltage of the second transmission line to a reference voltage during a reset operation, and
- wherein the TDI is configured to detect the display noise through the second transmission line after the reset operation.

12. The touch display device of claim 8, wherein the plurality of pixels are connected to a plurality of data lines and a plurality of gate lines, and
- wherein the touch display device further comprises a display driving integrated circuit configured to control voltages of the plurality of data lines and the plurality of gate lines.

13. The touch display device of claim 8, wherein the touch panel is formed on the display panel.

14. The touch display device of claim 13, wherein the display noise is a noise transferred from the display panel to the touch panel through a parasitic capacitor formed between the display panel and the touch panel.

15. A touch display device comprising:
- a display panel comprising a plurality of pixels;
- a touch panel configured to receive a user touch or proximity thereon and comprising a plurality of transmission lines and a plurality of reception lines; and
- a touch driving integrated circuit (TDI) configured to transmit a first touch signal sensing the user touch or proximity to a first transmission line among the transmission lines, receive the first touch signal plus a first noise through a first reception line among the reception lines, detect a second noise through at least one of a second transmission line among the transmission lines and a second reception line among the reception lines, and output the first touch signal less the first noise by offsetting the first noise with the second noise for determination of the sensing the user touch or proximity,
- wherein, during transmission of the first touch signal, the TDI does not transmit a touch signal sensing the user touch or proximity to the at least one of the second transmission line and the second reception line.

16. The touch display device of claim 15, wherein the TDI is further configured to transmit a plurality of touch signals, comprising the first touch signal, sensing the user touch or proximity to the plurality of transmission lines, receive the plurality of touch signals plus a plurality of first noises, comprising the first noise, through the reception lines comprising the first reception line, and detect a plurality of second noises comprising the second noise, and output the touch signals less the first noises by offsetting the first noises with the second noises, respectively, and
- wherein the second transmission line is the most adjacent to the first transmission line a transmission line, among the transmission lines, and the second reception line is the most adjacent to the first reception line among the reception lines.

17. The touch display device of claim 15, wherein the TDI is further configured to transmit a plurality of touch signals, comprising the first touch signal, sensing the user touch or proximity to the plurality of transmission lines, receive the plurality of touch signals plus a plurality of first noises, comprising the first noise, through the reception lines comprising the first reception line, and detect a plurality of second noises comprising the second noise, and output the touch signals less the first noises by offsetting the first noises with the second noises, respectively, and
- wherein the second transmission line is a dummy line adjacent to the first transmission line, and the second reception line is a dummy line adjacent to the first reception line.

18. The touch display device of claim 15, wherein the TDI is further configured to sequentially transmit a plurality of touch signals comprising the first touch signal to the plurality of transmission lines, receive the plurality of touch signals plus a plurality of first noises comprising the first noise, and detect a plurality of second noises comprising the second noise, and output the touch signals less the first noises by offsetting the first noises with the second noises, and
- wherein the second transmission line is a transmission line to which a second touch signal among the touch signals is transmitted immediately before or after the first touch signal is transmitted to the first transmission line in the sequential transmission of the touch signals to the transmission lines.

19. The touch display device of claim 15, wherein the first noise comprises a noise generated at a parasitic capacitor which is formed between the display panel and the first reception line and forms a path for the first noise to the first reception line, and
    wherein the second noise comprises a noise generated at a parasitic capacitor which is formed between the display panel and the at least one of the second transmission line and the second reception line and forms a path for the second noise to the at least one of the second transmission line and the second reception line.

\* \* \* \* \*